United States Patent
Ramotowski et al.

(10) Patent No.: US 10,941,941 B2
(45) Date of Patent: Mar. 9, 2021

(54) FUEL INJECTOR WITH A CENTER BODY ASSEMBLY

(71) Applicant: Solar Turbines Incorporated, San Diego, CA (US)

(72) Inventors: Michael Ramotowski, San Diego, CA (US); Matthew Mayer, Cupertino, CA (US); Donald Cramb, San Diego, CA (US); Sean K. Spivey, La Mesa, CA (US); James Piper, Bonita, CA (US)

(73) Assignee: Solar Turbines Incorporated, San Diego, CA (US)

( * ) Notice: Subject to any disclaimer, the term of this patent is extended or adjusted under 35 U.S.C. 154(b) by 359 days.

(21) Appl. No.: 16/058,732

(22) Filed: Aug. 8, 2018

(65) Prior Publication Data

US 2020/0011533 A1   Jan. 9, 2020

Related U.S. Application Data

(60) Provisional application No. 62/694,174, filed on Jul. 5, 2018.

(51) Int. Cl.
| | | |
|---|---|---|
| *F23R 3/36* | (2006.01) |
| *F23R 3/28* | (2006.01) |
| *F23R 3/10* | (2006.01) |
| *F02C 7/228* | (2006.01) |
| *F02C 7/22* | (2006.01) |
| *F23R 3/34* | (2006.01) |

(52) U.S. Cl.
CPC ............. *F23R 3/286* (2013.01); *F02C 7/222* (2013.01); *F02C 7/228* (2013.01); *F23R 3/10* (2013.01); *F23R 3/343* (2013.01)

(58) Field of Classification Search
CPC .......... F23R 3/343; F23R 3/36; F23D 17/002; F23D 2900/00014; F23C 1/08; F23C 2700/02
See application file for complete search history.

(56) References Cited

U.S. PATENT DOCUMENTS

| | | | | |
|---|---|---|---|---|
| 1,887,407 A * | 11/1932 | Forney | ................. | F23D 17/002 |
| | | | | 239/431 |
| 3,763,650 A * | 10/1973 | Hussey | ................. | F23D 11/104 |
| | | | | 60/39.463 |
| 6,543,235 B1 | 4/2003 | Crocker et al. | | |
| 2002/0162333 A1 | 11/2002 | Zelina | | |
| 2004/0035114 A1* | 2/2004 | Hayashi | ................. | F23R 3/343 |
| | | | | 60/737 |

(Continued)

FOREIGN PATENT DOCUMENTS

JP   2008313064 A   11/2006

*Primary Examiner* — Gerald L Sung
(74) *Attorney, Agent, or Firm* — Procopio, Cory, Hargreaves & Savitch LLP

(57) ABSTRACT

A center body assembly for a lean direct injection fuel injector is disclosed. The center body assembly defines a primary liquid passage, a liquid gallery, a liquid main first passage, a liquid main second passage, and an atomizer assembly. The primary liquid passage supplies liquid fuel to the liquid gallery. The liquid gallery aligns with the primary liquid passage and distributes fuel to the liquid main first passage, and subsequently to the liquid main second passage. The atomizer assembly is in flow communication with the liquid main second passage and provides atomized fuel for combustion.

17 Claims, 13 Drawing Sheets

(56) References Cited

U.S. PATENT DOCUMENTS

| | | |
|---|---|---|
| 2005/0241319 A1 | 11/2005 | Graves et al. |
| 2011/0197594 A1* | 8/2011 | Khosla .................... F23L 7/002 |
| | | 60/776 |
| 2013/0214063 A1* | 8/2013 | Ryon .................... F23D 11/383 |
| | | 239/463 |
| 2014/0190168 A1* | 7/2014 | Shershnyov .............. F23R 3/36 |
| | | 60/737 |
| 2016/0010855 A1* | 1/2016 | Myers .................... F23D 11/24 |
| | | 239/403 |
| 2016/0341427 A1* | 11/2016 | Roh ........................ F23R 3/283 |
| 2017/0038074 A1* | 2/2017 | Myers .................... F23R 3/343 |
| 2017/0159561 A1* | 6/2017 | Shershnyov .............. F02C 3/30 |
| 2017/0191428 A1 | 7/2017 | Spivey et al. |
| 2017/0191457 A1 | 7/2017 | Spivey et al. |
| 2017/0191667 A1* | 7/2017 | Spivey .................... F23R 3/343 |
| 2019/0137105 A1* | 5/2019 | Seok ........................ F23R 3/14 |

* cited by examiner

FUEL INJECTOR WITH A CENTER BODY ASSEMBLY

CROSS-REFERENCE TO RELATED APPLICATIONS

This application claims the benefit of U.S. provisional patent application Ser. No. 62/694,174 entitled "Fuel Injector with a Center Body Assembly," filed on Jul. 5, 2018. The foregoing application is hereby incorporated by reference in their entirety.

TECHNICAL FIELD

The present disclosure generally pertains to gas turbine engines, and to a fuel injector with a center body assembly.

BACKGROUND

Gas turbine engines include compressor, combustor, and turbine sections. The combustor includes fuel injectors that supply fuel for the combustion process. During operation of the fuel injectors, lean direct injection of liquid fuels may result in the generation of some smoke during light off and acceleration to idle.

U.S. patent No. 2002/0162333 to J. Zelina et A1. discloses a low emission fuel injection system and combustion chamber for use in gas turbine engines that comprises one fuel injection body having a dual circuit to supply both pilot and main fuel systems. Both pilot liquid fuel circuit and a main liquid fuel circuit inject fuel at essentially the same axial and radial location. The recessed pilot fuel injection site is along the combustor centerline into a swirling air passage produced by axial air swirlers. The main fuel is injected radially through a plurality of injection sites, at a compound angle, into the inner diameter of a swirling air passage produced by radial air swirlers. The fuel/air residence time prior to entering the combustion chamber is relatively short, minimizing the likelihood of auto ignition. During pilot circuit only operation, the flame is stabilized by a swirler produced recirculation zone, producing high temperatures to completely burn the fuel producing low CO and UHC (unburned hydrocarbons) emissions. During intermediate and high engine power conditions, both the main fuel and pilot circuits discharge fuel into a swirler produced, high air flow, recirculation zone producing a fuel lean, low temperature flame to reduce NOx emissions.

The present disclosure is directed toward overcoming one or more of the problems discovered by the inventors.

SUMMARY

A center body assembly for a fuel injector of a gas turbine engine is disclosed herein. In embodiments, the center body assembly includes a center body and a liquid main assembly. The center body defines a liquid tube port, a liquid main port, and a primary liquid passage. The liquid tube port extends in the center body and extends into a base end of the center body. The liquid main port extends into a liquid main end of the center body. The liquid main port includes a liquid main port surface that is a bottom surface of the liquid main port. The primary liquid passage extends from the liquid tube port to the liquid main port and is in flow communication with the liquid tube port.

The liquid main assembly is joined to the center body at the liquid main port. The liquid main assembly defines a liquid main body, a liquid main base, a liquid main base flange, a liquid gallery, a liquid main first passage, a liquid main second passage, and atomizer assembly. The liquid gallery is in flow communication with the primary liquid passage. The liquid gallery is a channel located in the liquid main base, extending around the liquid main base, and abutting the liquid main port surface, adjacent the main port and in flow communication with the primary liquid passage.

The liquid main first passage is in flow communication with the liquid gallery. The liquid main second passage is in flow communication with the liquid main first passage. The atomizer assembly is in flow communication with the liquid main second passage.

DETAILED DESCRIPTION

The systems and methods disclosed herein include a fuel injector for a gas turbine engine. In embodiments, the fuel injector includes a two stream design that injects liquid fuel directly into the primary zone. One liquid fuel stream is the main stream and is a configuration of multiple jets and the other liquid fuel stream is a pilot stream and is a configuration of a single jet. During light off and during acceleration to idle, a controlled fuel amount is supplied through the pilot liquid fuel circuit. By using a controlled amount of the liquid fuel through the pilot liquid fuel circuit during this stage of operation, the fuel atomization may be adequate to provide reliable light around the combustion system and minimize smoke generation. Once operation is at or near idle, the fuel is supplied to both the main liquid fuel circuit and the pilot liquid fuel circuit with the majority of fuel flowing through the main liquid fuel circuit. The split may be maintained through the operating range above idle to minimize smoke emissions and liquid fuel system pressure.

Figure 1:
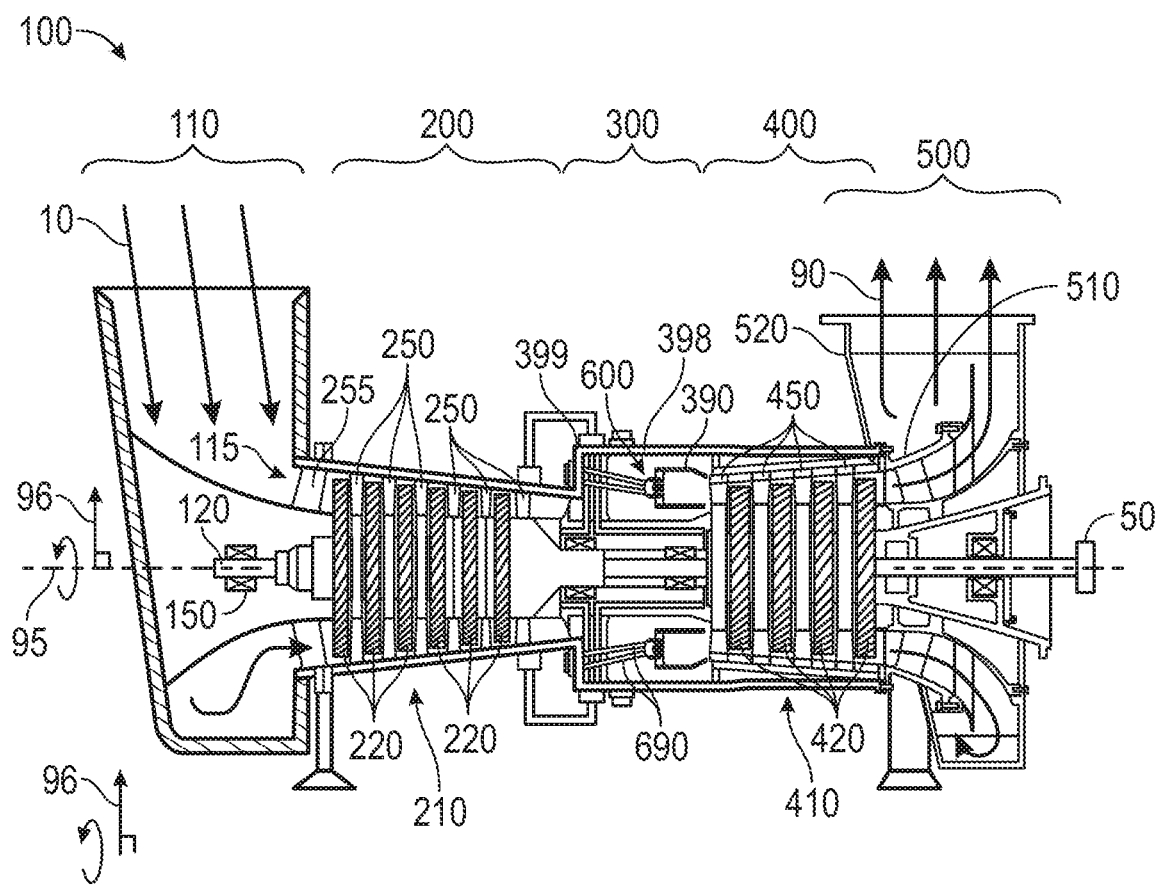
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. For clarity, some reference numbers are not shown for every occurrence, particularly for multiple occurrences of identical or nearly identical (e.g., mirror images)

elements that are shown more than once in a figure. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a gas producer or "compressor" 200, a combustor 300, a turbine 400, an exhaust 500, and a power output coupling 50. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 600 and includes one or more combustion chambers 390. Each fuel injector 600 includes a flange assembly 610, an injector head 630, and fuel tubes 690 extending between the flange assembly 610 and the injector head 630. In the gas turbine engine shown, each fuel injector 600 is installed into combustor 300 in the axial direction relative to center axis 95 through radial case portion 399 of combustor case 398 or the compressor diffuser case.

The turbine 400 includes a turbine rotor assembly 410, and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520.

Figure 2:
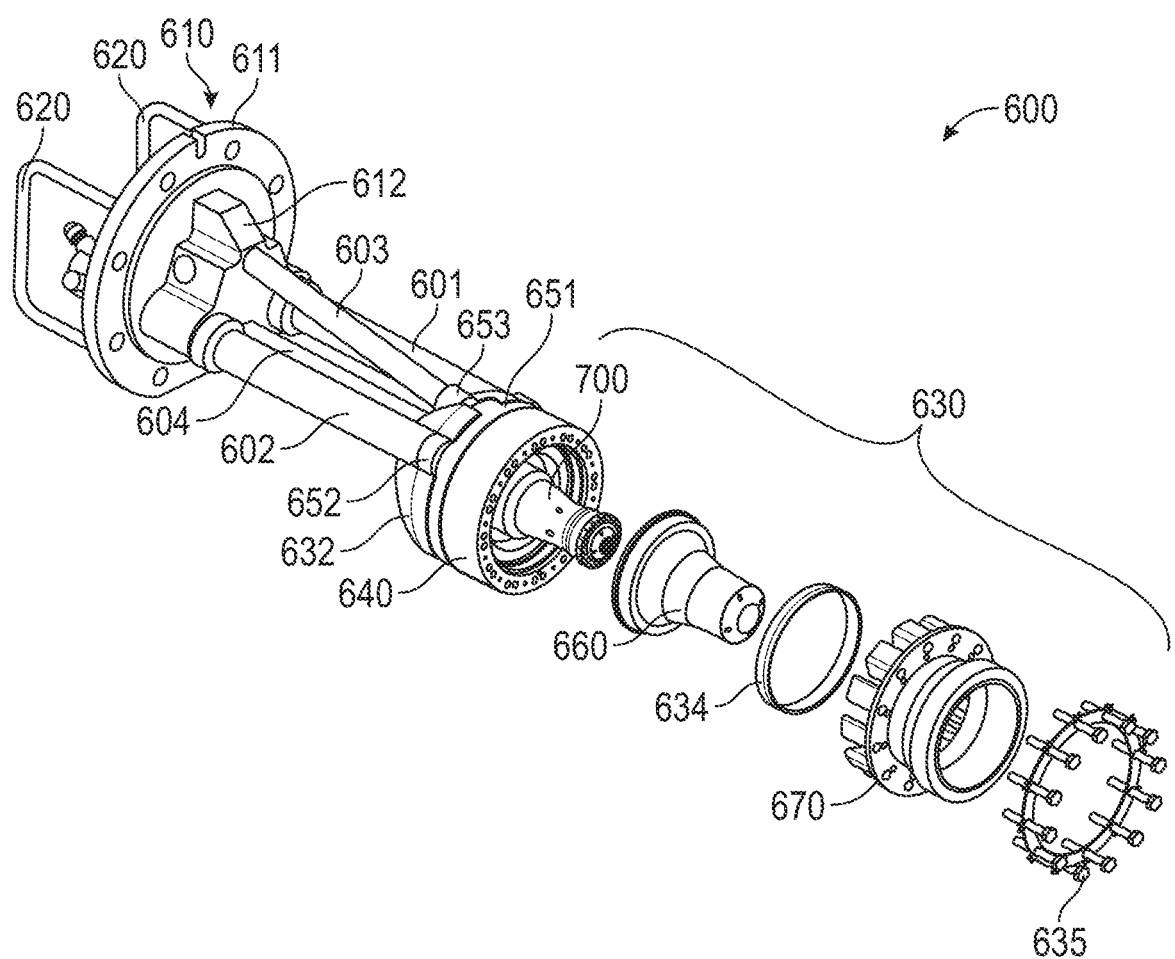
FIG. 2 is an exploded view of the fuel injector of FIG. 1.

The fuel injector 600 may include multiple fuel circuits for delivering fuel to the combustion chamber 390. FIG. 2 is an exploded view of the fuel injector 600 of FIG. 1. Referring to FIG. 2, the flange assembly 610 may include a flange 611, a distribution block 612, fittings, and handles 620. A single fitting may be used for each fuel circuit. The flange 611 may be a cylindrical disk and may include holes for fastening the fuel injector 600 to the combustor case 398.

The distribution block 612 extends from the flange 611 and may extend in the axial direction of the flange 611. The flange 611 and the distribution block 612 may be formed as an integral piece. The distribution block 612 may act as a manifold for one or more of the fuel circuits to distribute the fuel flow of one or more of the circuits through multiple fuel tubes or passages.

The fuel tubes 690 may include a first primary tube 601, a second primary tube 602, a secondary tube 603, and a tube stem 604. The first primary tube 601 and the second primary tube 602 may be part of a primary main gas fuel circuit. The first primary tube 601 and the second primary tube 602 may be parallel and may extend parallel to an assembly axis 797. The assembly axis 797 including a longitudinal axis to a center body assembly 700. An assembly axis radial 896 is perpendicular and radiating outward from the assembly axis 797.

The secondary tube 603 may be part of the primary main gas fuel circuit or may be part of a secondary main gas fuel circuit. The secondary tube 603 may extend from the distribution block 612 to the injector head 630 at an angle relative to the first primary tube 601 and the second primary tube 602, and may act as a support tube for the injector head 630 to prevent deflection of the injector head 630. The tube stem 604 may include passages for a main liquid fuel circuit, a pilot liquid fuel circuit, and a pilot gas fuel circuit.

The injector head 630 may include an injector body 640, an outer cap 632, an inner premix tube 660, an outer premix barrel 670, the center body assembly 700, a lock ring 634, and fasteners 635. The injector body 640 may include a first primary fuel transfer fitting 651, a second primary fuel transfer fitting 652, and a secondary fuel transfer fitting 653. The first primary tube 601 may connect to the injector head 630 at the first primary fuel transfer fitting 651. The second primary tube 602 may connect to the injector head 630 at the second primary fuel transfer fitting 652, and the secondary tube 603 may connect to the injector head 630 at the secondary fuel transfer fitting 653.

The outer cap 632 may connect to the injector body 640 and may be located between the injector body 640 and the flange assembly 610. The outer cap 632 may include openings that allow compressor discharge air to enter into the injector head 630.

The flange assembly 610, the gas tubes, liquid tubes, tube stem 604, the injector body 640, the inner premix tube 660, the outer premix barrel 670, and the center body assembly 700 include or may be assembled to form passages for the main gas fuel circuit(s), the main liquid fuel circuit, the pilot liquid fuel circuit, and the pilot gas fuel circuit. Embodiments of these fuel circuits are disclosed herein and will be discussed in association with the remaining figures.

The lock ring 634 and the fasteners 635 may be used to hold the various components together. The lock ring 634 may be used to secure the inner premix tube 660 to the injector body 640.

Figure 3:
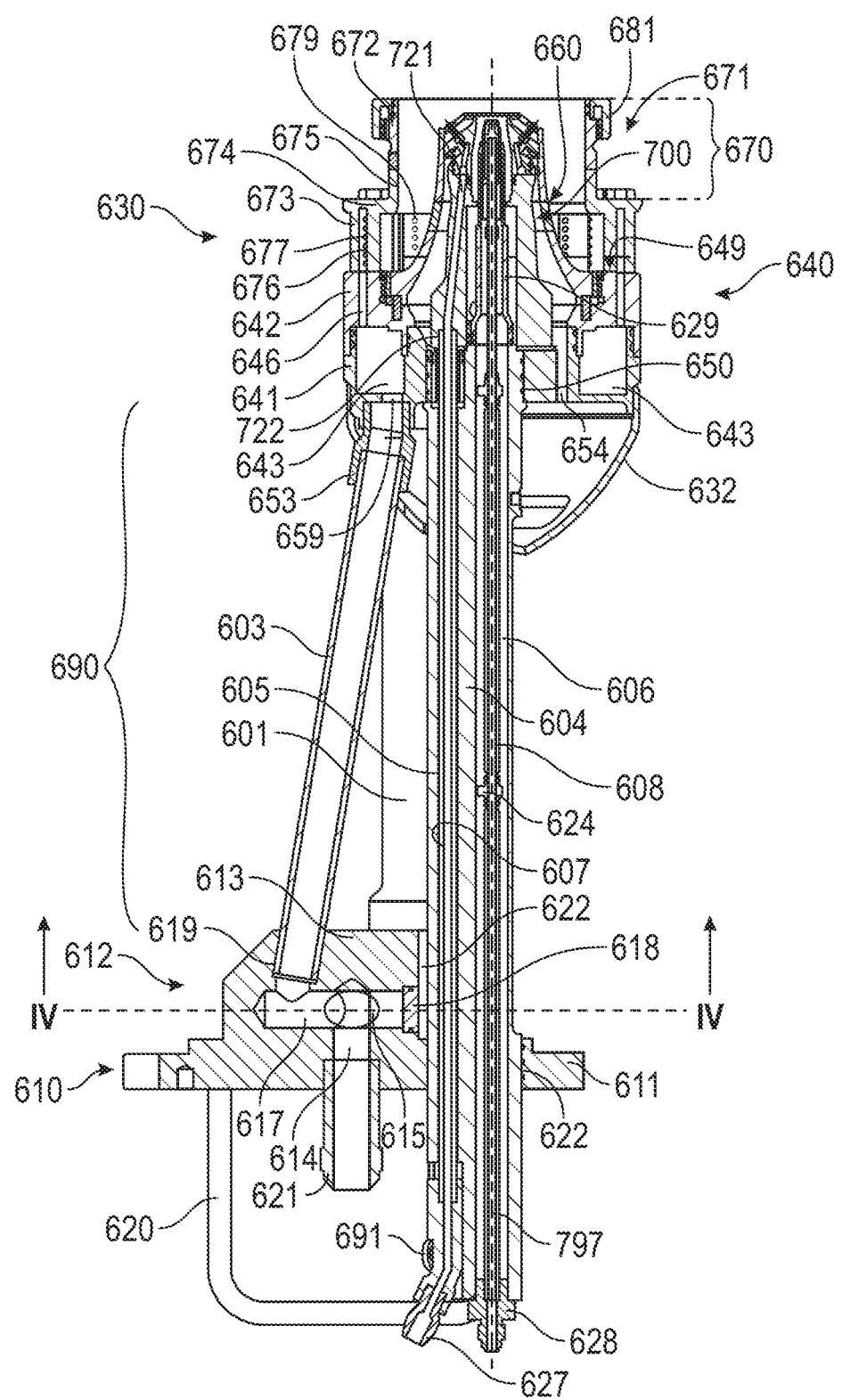
FIG. 3 is a cross-sectional view of an embodiment of the fuel injector of FIG. 2.
Figure 4:
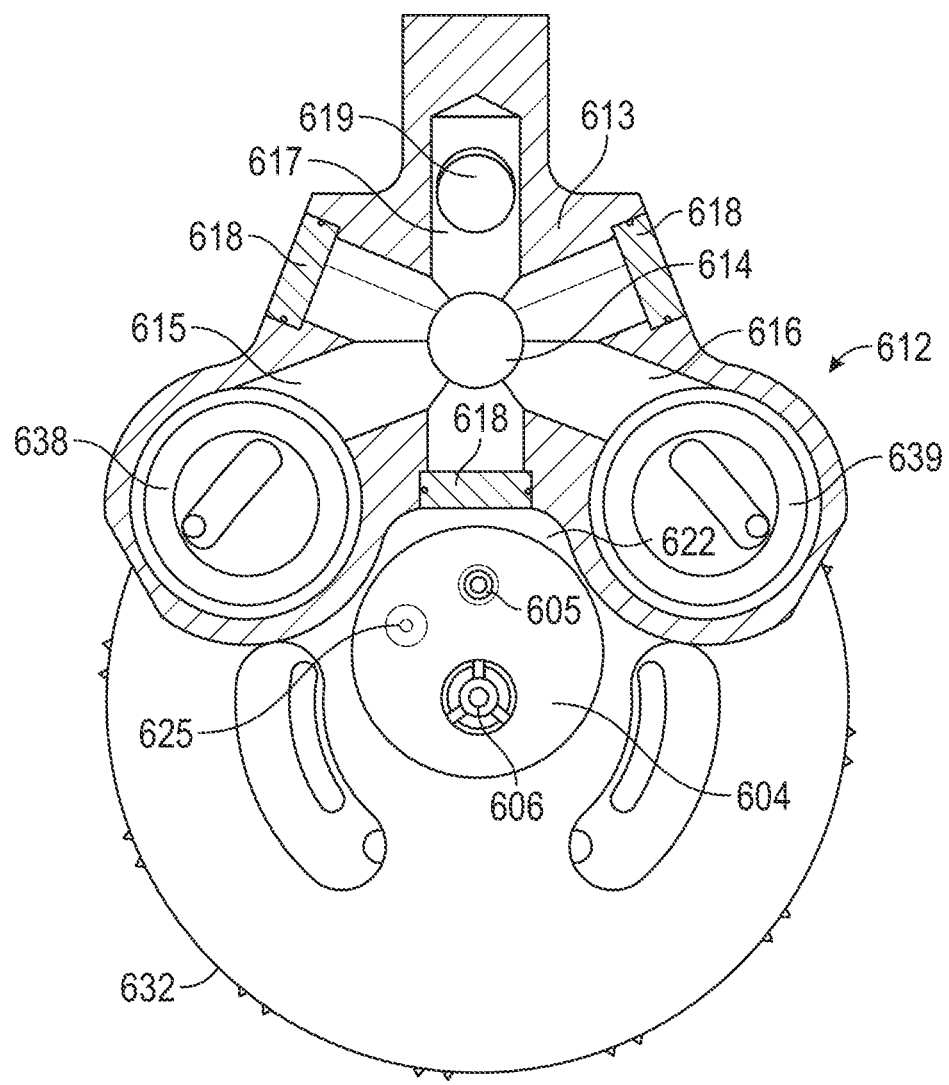
FIG. 4 is a cross-sectional view of the distribution block of FIGS. 2 and 3 taken along line IV-IV.

FIG. 3 is a cross-sectional view of an embodiment of the fuel injector 600 of FIG. 2. FIG. 4 is a cross-sectional view of the distribution block 612 of FIGS. 2 and 3 taken along line IV-IV. In the embodiment illustrated in FIGS. 3 and 4, the first primary tube 601, the second primary tube 602, and the secondary tube 603 form a single primary gas fuel circuit.

Referring to FIG. 3, the flange assembly 610 may include a primary gas fitting 621 affixed to the flange 611 and a gas inlet passage 614 in flow communication with the primary gas fitting 621. The gas inlet passage 614 may extend through the flange 611 and into the distribution block 612. Referring to FIG. 4, the distribution block 612 includes a first primary passage 615, a second primary passage 616, and a secondary passage 617. In the embodiment illustrated, the first primary passage 615, the second primary passage 616, and the secondary passage 617 are all in flow communication with the gas inlet passage 614. As illustrated in FIG. 4, the first primary passage 615, the second primary passage 616, and the secondary passage 617 may connect to the gas inlet passage 614, and may be in a parallel flow configuration.

The flange assembly 610 may also include a first primary tube port 638, a second primary tube port 639, and a secondary tube port 619. The first primary tube 601 may connect to the distribution block 612 at the first primary tube port 638, may be in flow communication with the first primary passage 615 and may fluidly connect the first primary passage 615 to the first primary tube 601. The second primary tube 602 may connect to the distribution block 612 at the second primary tube port 639, may be in flow communication with the second primary passage 616, and may fluidly connect the second primary passage 616 to the second primary tube 602. The secondary tube 603 may connect to the distribution block 612 at the secondary tube port 619, may be in flow communication with the secondary passage 617, and may fluidly connect the secondary passage 617 to the secondary tube 603.

Referring to FIGS. 3 and 4, the first primary passage 615, the second primary passage 616, and the secondary passage 617 may all intersect the gas inlet passage 614 at the same location. In the embodiment illustrated, the first primary passage 615, the second primary passage 616, and the secondary passage 617 are cross-drilled. The first primary passage 615 is drilled at an angle from the side of the distribution block 612, intersects with the gas inlet passage 614 and extends to the first primary tube port 638. The second primary passage 616 is drilled at an angle from the opposite side of the distribution block 612, intersects with the gas inlet passage 614 and the first primary passage 615 and extends to the second primary tube port 639. The secondary passage 617 is drilled up from the bottom of the distribution block 612, intersects with the gas inlet passage 614, the first primary passage 615 and the second primary passage 616, and extends to the secondary tube port 619. The flange assembly 610 may include a plug 618 at the end of each passage distal to its respective tube port.

In some embodiments, the first primary passage 615, the second primary passage 616, and the secondary passage 617 may all start at the gas inlet passage 614 and extend to their respective tube ports. For example, the first primary passage 615, the second primary passage 616, and the secondary passage 617 may be formed concurrently with the distribution block 612 during an additive manufacturing process and may not require cross-drilling.

The flange assembly 610 may also include a stem cavity 622. The stem cavity 622 may extend through the flange 611 and may also extend through the distribution block 612. In the embodiment illustrated, the distribution block 612 is shaped to extend around the tube stem 604.

The tube stem 604 may extend through the flange assembly 610 and into the injector head 630. The tube stem 604 may include a main liquid tube cavity 605, a pilot liquid tube cavity 606, and a pilot gas passage 625 extending therethrough.

The fuel injector 600 may also include a main liquid fitting 627, a pilot liquid fitting 628, and a pilot gas fitting 691 connected to the tube stem 604 distal to the injector head 630. In embodiments, the fuel injector 600 includes a main liquid tube 607 extending through the main liquid tube cavity 605 and a pilot liquid tube 608 extending through the pilot liquid tube cavity 606. The main liquid tube 607 is in flow communication with the main liquid fitting 627 and the pilot liquid tube 608 is in flow communication with the pilot liquid fitting 628. In the embodiment illustrated, the fuel injector 600 includes standoffs for the pilot liquid tube 608 to maintain the spacing between the pilot liquid tube 608 and the tube stem 604 at pilot liquid tube cavity 606.

Figure 5:
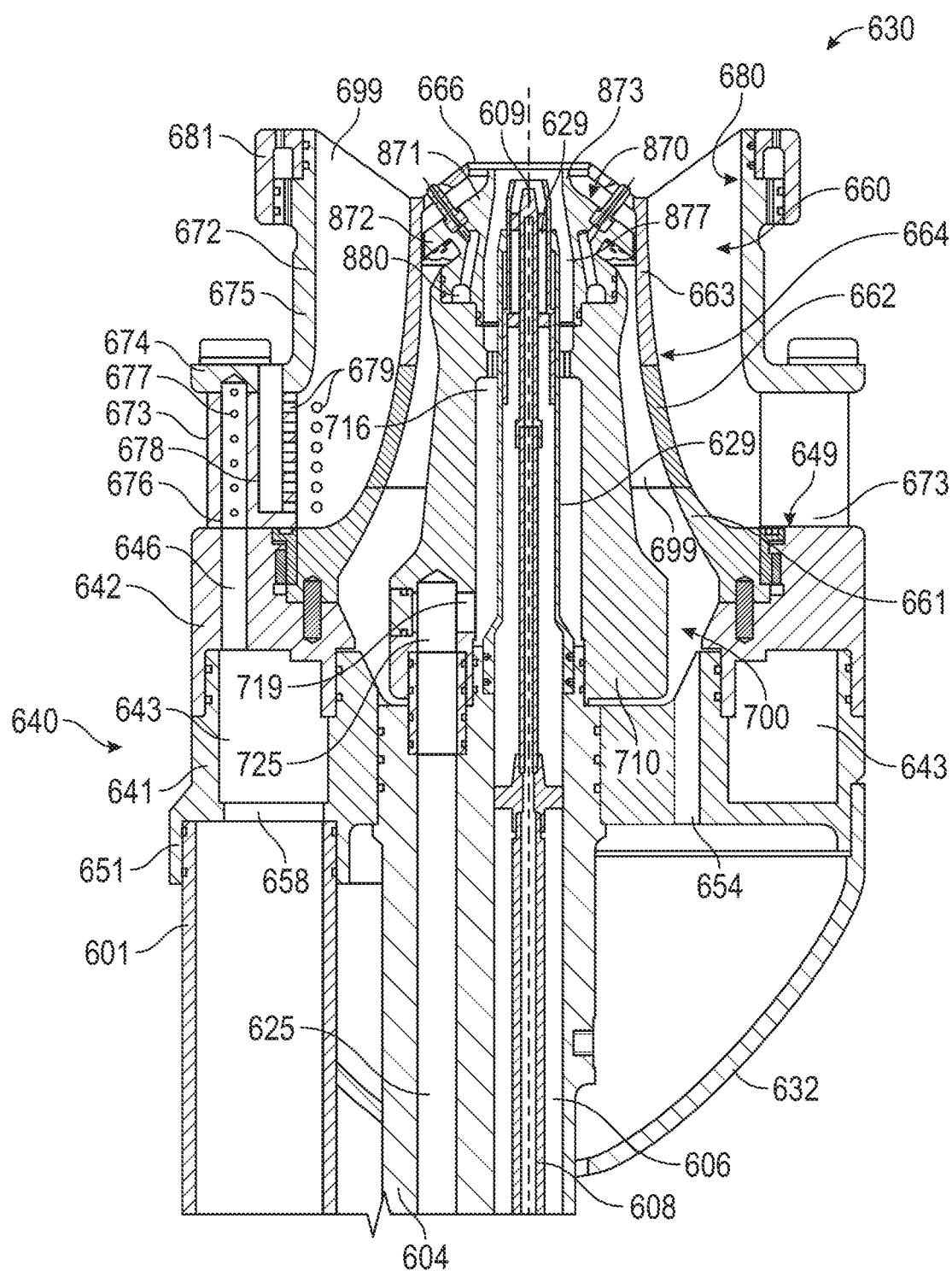
FIG. 5 is a cross-sectional view of the injector head of FIGS. 2 and 3.

FIG. 5 is a cross-sectional view of the injector head 630 of FIGS. 2 and 3. The injector head 630 may include an assembly axis 797. All references to radial, axial, and circumferential directions and measures of the injector head 630 and the elements of the injector head 630 refer to the assembly axis 797, and terms such as "inner" and "outer" generally indicate a lesser or greater radial distance from the assembly axis 797. The center of the flange 611 may be offset from the assembly axis 797.

Referring to FIGS. 3 and 5, the injector head 630 may include an injector body 640, an outer cap 632, an outer premix barrel 670, an inner premix tube 660, a premix barrel cap 681, pilot tube shield 629, and a center body assembly 700. The injector body 640 may include an aft portion 641 and a forward portion 642.

The aft portion 641 may have a cylindrical shape and may be a hollow cylinder with a 'C', 'U', or 'J' shaped cross-section revolved about assembly axis 797. The forward portion 642 may also have a cylindrical shaped base and may also be a hollow cylinder. The forward portion 642 may also include a coaxial hollow cylinder portion extending in the aft direction from the base. The diameter of the hollow cylinder portion may be larger than the diameter of the base forming a counterbore for the inner premix tube 660. The forward portion 642 may also include a counterbore for the lock ring 634 that may be used to secure the inner premix tube 660 to the forward portion 642. The forward portion 642 may also include an injector body face 649. The injector body face 649 may be an annulus and may face in the forward axial direction, opposite the aft portion 641. The forward portion 642 and aft portion 641 may be metallurgically bonded, such as by brazing or welding.

The first primary fuel transfer fitting 651, the second primary fuel transfer fitting 652, and the secondary fuel transfer fitting 653 may be integral to the aft portion 641 and may be located on the opposite axial side of the aft portion 641 relative to the forward portion 642.

The injector head 630 also includes a primary gas gallery 643, primary gallery inlets 658, a secondary gallery inlet 659, and body primary gas passages 646. The aft portion 641 and the forward portion 642 may be joined together to form the primary gas gallery 643. The primary gas gallery 643 may be an annular cavity extending around the assembly axis 797. In embodiments, the 'C', 'U', or 'J' cross-sectional shape of the aft portion 641 revolved about assembly axis 797 may form the primary gas gallery 643 when affixed to the forward portion 642.

The injector head 630 may include a primary gallery inlet 658 adjacent each primary fuel transfer fitting 651, such as the first primary fuel transfer fitting 651 and the second primary fuel transfer fitting 652. The primary gallery inlet 658 may be an opening extending through an aft end of the aft portion 641 that extends to the primary gas gallery 643 so that the primary gas tube connected to the adjacent primary fuel transfer fitting 651 is in flow communication with the primary gas gallery 643. In the embodiment illustrated, the secondary gallery inlet 659 is an opening extending through an aft end of the aft portion 641 that extends to the primary gas gallery 643 so that the secondary tube 603 is in flow communication with the primary gas gallery 643.

The body primary gas passages 646 may extend axially through the forward portion 642 from the primary gas gallery 643 to provide a path for the primary gas fuel to the outer premix barrel 670. In the embodiments illustrated in FIGS. 3-5, the main gas fuel is provided to the outer premix barrel 670 within a single main gas fuel circuit. The main gas fuel circuit includes the primary gas fitting 621, the gas inlet passage 614, the first primary passage 615, the second primary passage 616, the secondary passage 617, the first primary tube 601, the second primary tube 602, the secondary tube 603, the primary gas gallery 643, and the body primary gas passages 646.

The injector head may also include a head stem cavity 650 a center body opening 655, and feed air passages 654. The head stem cavity 650 may extend through the aft portion 641 and may be the hollow portion of the hollow cylinder shape of the aft portion 641. The center body opening 655 may be coaxial to the forward portion 642 and may extend through the base of the forward portion 642 in the axial direction. The feed air passages 654 may also extend through the base of the forward portion 642 in the axial direction. The feed air passages 654 may be located radially outward from the assembly axis 797 and the center body opening 655, and may be located radially inward from an inner surface of the hollow cylinder portion of the forward portion 642.

The outer cap 632 may be a dome shaped cap that attaches to the injector body 640 at the radially outer surface of the aft portion 641. The outer cap 632 may include multiple holes and passageways for one or more of the fuel tubes 690 and for compressor discharge air to enter the fuel injector 600.

The outer premix barrel 670 joined to the injector body 640 and located radially outward from the inner premix tube 660. The outer premix barrel 670 may include a barrel 671, a barrel end 672, and a premix tube outer surface 680. The barrel 671 may include a body portion 674, a barrel portion 675, vanes 673, vane primary gas passages 676, primary gas outlets 677, vent air passages 678, and vent air outlets 679. The body portion 674 may have an annular disk shape. The barrel portion 675 may extend axially aft from body portion 674. In the embodiment shown, the barrel portion 675 extends from the aft and radially inner portion of the body portion 674. The barrel portion 675 may have a hollow cylinder or cylindrical tube shape. The hollow cylinder or cylindrical tube shape may be tapered or have a tapered inner surface.

The vanes 673 may extend axially forward from body portion 674. The vanes 673 may be wedge shaped and may have the tip of the wedge truncated or removed. The vanes 673 may include other shapes configured to direct and swirl air into a premix passage 669.

A vane primary gas passage 676 may extend axially into each vane 673. Each vane primary gas passage 676 is aligned with and in flow communication with a body primary gas passage 646. The primary gas outlets 677 extend from a vane primary gas passage 676 and through the vanes 673. In the embodiment illustrated, the primary gas outlets 677 extend transverse to the vane primary gas passages 676 so that the primary gas fuel will exit from the primary gas outlets 677 between adjacent vanes 673 in a tangential direction relative to the assembly axis 797 and into the premix passage 669. In the embodiment illustrated, the vane primary gas passages 676 and the primary gas outlets 677 are part of the main gas fuel circuit.

A vent air passage 678 may also extend axially into each vane 673 and may be located adjacent a vane primary gas passage 676. The vent air outlets 679 extend from the vent air passages 678 through vanes 673 and may exit the vanes 673 at the narrow end of the wedge shape to prevent lower pressure pockets from forming at the end of the vanes 673.

The barrel end 672 may be metallurgically joined to the barrel 671 at the aft end of the barrel portion 675, such as welding or brazing. The barrel end 672 may have a hollow cylinder or cylindrical tube shape similar to the shape of the barrel portion 675. The premix barrel cap 681 may be metallurgically joined, such as by welding or brazing, to the aft end of the barrel end 672 at the outer surface of the barrel end 672. The premix barrel cap 681 may have a 'C', 'U', or 1' shaped cross-section that is revolved about assembly axis 797. The premix barrel cap 681 may form an air pocket or channel with the barrel end 672.

The premix tube outer surface 680 may include the radially inner cylindrical surfaces of the barrel 671 and the barrel end 672. When installed in the injector head 630, the premix tube outer surface 680 may be located radially outward from the inner premix tube 660.

Referring to FIG. 2, the outer premix barrel 670 may be secured to the injector body 640 with fasteners 635. The vanes 673 may contact the injector body face 649 when the outer premix barrel 670 is joined to the injector body 640.

Referring again to FIGS. 3 and 5, the inner premix tube 660 may be joined to the injector body 640 and may include a transition end 661, a middle tube 662, a tip end 663, a tip face 665, and a premix tube inner surface 664. In the embodiment illustrated in FIG. 3, the transition end 661 is a hyperbolic funnel that initiates a transition from the radial direction to the axial direction relative to the assembly axis 797.

The middle tube 662 may be metallurgically joined to the aft end of the transition end 661, such as by welding or brazing. In the embodiment shown, the middle tube 662 continues the hyperbolic funnel shape of the transition end 661. In other embodiments, middle tube 662 may be a conical frustum, a funnel, or formed from a cross-section with curved outer and inner surfaces revolved about the axis of inner premix tube 660.

The tip end 663 may be metallurgically joined to the aft end of the middle tube 662 distal to the transition end 661. The tip face 665 extends radially inward from the tip end 663 and may be integral to the tip end 663. The tip face 665 may extend and tapper inward from the tip end 663 to a tip opening 666 where the tip face 665 is radially wider at the tip end 663 and radially narrower at the tip opening 666. The tip face 665 may be angled away from the assembly axis radial 896. The tip face 665 may include an atomizer opening 857 to provide an opening for the atomizer assembly 850. The atomizer opening 857 may be cylindrical in shape or may be a cone shape with the top removed, such as a frustum shape. The tip opening 666 may have an annular disk shape which is formed by the tip end 663.

The premix tube inner surface 664 is at least a portion of the outer surface of the inner premix tube 660. The premix tube inner surface 664 may be a revolved surface about the axis of the inner premix tube 660 that transitions from a radial or an annular ring surface to a circumferential or cylindrical surface. In the embodiment illustrated, the premix tube inner surface 664 is a hyperbolic funnel or a segment of a pseudosphere. In other embodiments, the radial surface may transition to a cylindrical surface with a combination of line segments or curves revolved about the axis of inner premix tube 660.

The premix tube inner surface 664 is spaced apart from the premix tube outer surface 680 forming a premix passage 669 there between. The premix passage 669 may be an annular passage. Compressor discharge air may enter the premix passage 669 between the vanes 673 and may mix with the gas fuel exiting the primary gas outlets 677. The premix passage 669 may direct the fuel air mixture into the combustion chamber 390 for combustion.

The pilot liquid tube 608 may include a pilot tube tip 609. The pilot tube tip 609 may be a single atomizer and may be part of the pilot liquid fuel circuit. The pilot tube tip 609 may include a pressure swirl configuration or a plain orifice configuration. The pilot tube shield 629 may include an axial portion located radially inward of the center body assembly 700 and is configured to shroud the pilot tube tip 609.

The center body assembly 700 may be located radially inward of the inner premix tube 660 and of the injector body 640. The center body assembly 700 may also be axially adjacent the tube stem 604 and may be metallurgically bonded, such as by brazing or welding, to the tube stem 604.

Referring to FIG. 5, the center body assembly 700 may include a center body 710 and a liquid main assembly 870. The center body 710 may be adjacent the tube stem 604. The liquid main assembly 870 may be located at the end of the center body 710 opposite the tube stem 604. The liquid main assembly 870 also extends from the end of the center body 710. The liquid main assembly 870 includes a liquid main body 871, a liquid main flange 872, and a liquid gallery 880. The liquid main flange 872 extends radially outward from the liquid main body 871 and is adjacent the tip end 663 of the inner premix tube 660.

The center body 710 includes an aft pilot bore 716, a pilot gas port 725, and a pilot gas inlet 719. The aft pilot bore 716 may be a counterbore that extends coaxially into the center body 710 relative to the assembly axis 797. The pilot gas port 725 is in flow communication with the pilot gas passage 625 and may extend axially into the center body 710 radially adjacent the aft pilot bore 716. The pilot gas inlet 719 connects the pilot gas port 725 to the aft pilot bore 716, and may extend radially between the pilot gas port 725 to the aft pilot bore 716. The pilot gas fitting 691, the pilot gas passage 625, the pilot gas port 725, and the pilot gas inlet 719 form a pilot gas fuel circuit for providing pilot gas fuel to the aft pilot bore 716 for directing the pilot gas fuel out of the tip opening 666 for combustion.

Referring to FIG. 3, the center body 710 also includes a liquid tube port 722 and a primary liquid passage 721. The liquid tube port 722 is in flow communication with the main liquid tube 607. The liquid tube port 722 may extend axially into a base end 711 of the center body 710 shown in FIGS. 9-10. The primary liquid passage 721 is in flow communication with the liquid tube port 722. The primary liquid passage 721 extends from the liquid tube port 722 to a liquid main port 823 through the center body 710 to deliver main liquid fuel to the liquid gallery 880 shown in FIGS. 9-10. The main liquid fitting 627, the main liquid tube 607, the liquid tube port 722, and the primary liquid passage 721 form a main liquid fuel circuit for providing main liquid fuel from the main liquid fitting 627 to the liquid gallery 880. The liquid gallery 880 is in flow communication with the atomizer assembly 850 through a liquid main first passage 875 and a liquid main second passage 879. The main liquid fuel is atomized and distributed by the atomizer assembly 850 for combustion.

Figure 6:
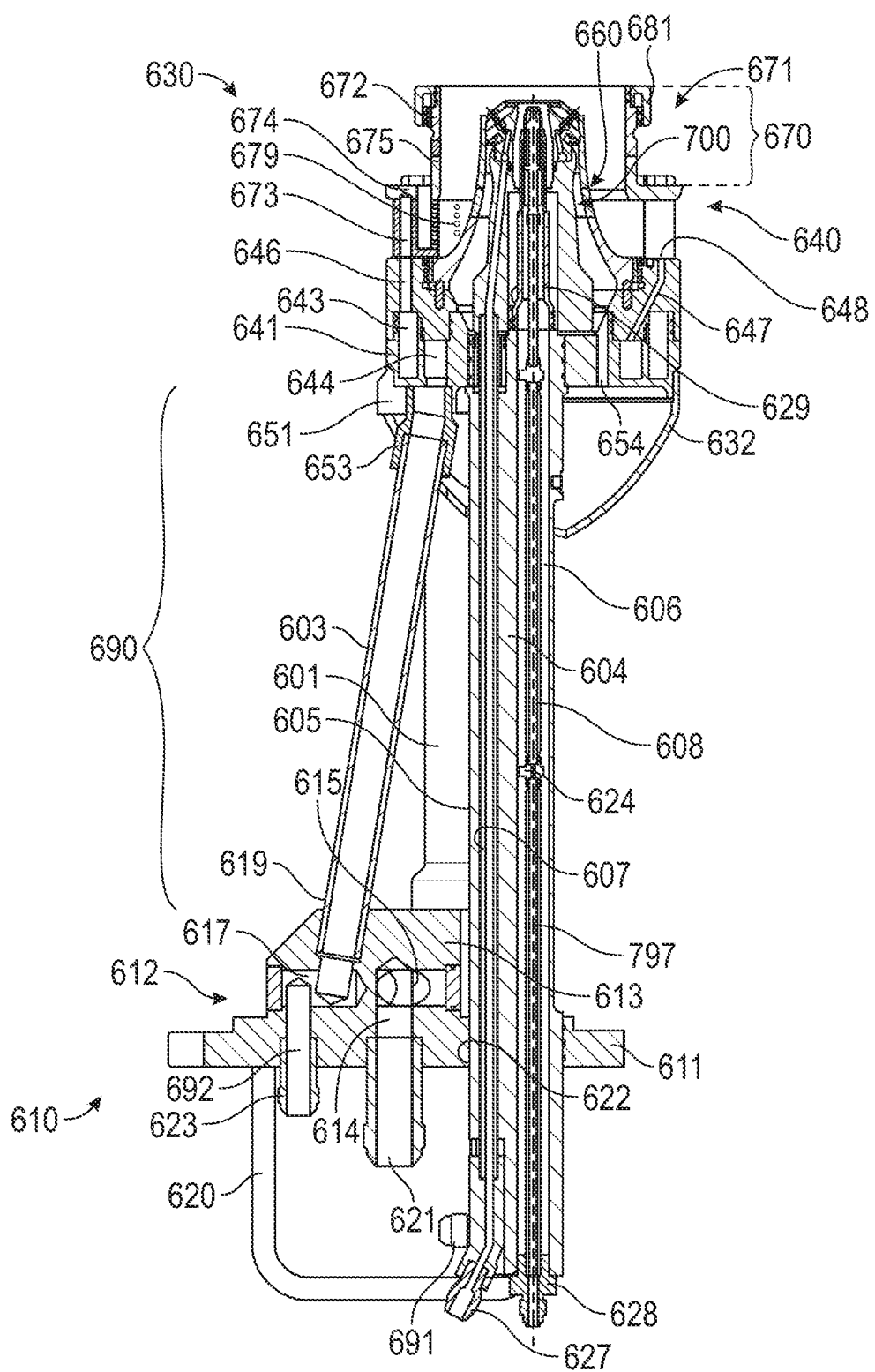
FIG. 6 is a cross-sectional view of an alternate embodiment of the Fuel injector of FIG. 2.

FIG. 6 is a cross-sectional view of an alternate embodiment of the fuel injector of FIG. 2. In the embodiment illustrated in FIG. 6, the first primary tube 601 and the second primary tube 602 form part of a primary gas fuel circuit, while the secondary tube 603 forms part of a secondary gas fuel circuit.

The primary gas fitting 621 is in flow communication with the first primary tube 601 and the second primary tube 602. The primary gas fitting 621 is not in flow communication with the secondary tube 603. In the embodiment illustrated in FIG. 6, the flange assembly 610 includes a secondary gas fitting 623 that is in flow communication with the secondary passage 617 and the secondary tube 603. The flange assembly 610 may include a secondary gas inlet passage 692 that fluidly connects the secondary gas fitting 623 to the secondary passage 617. The distribution block 612 may be configured to isolate the secondary gas fitting 623 and the secondary tube 603 from the primary gas fitting 621, the first primary tube 601, and the second primary tube 602.

The stem cavity 622, tube stem 604, main liquid fitting 627, pilot liquid fitting 628, pilot gas fitting 691, and their related features may be the same or similar as described above relative to the previous embodiment.

Figure 7:
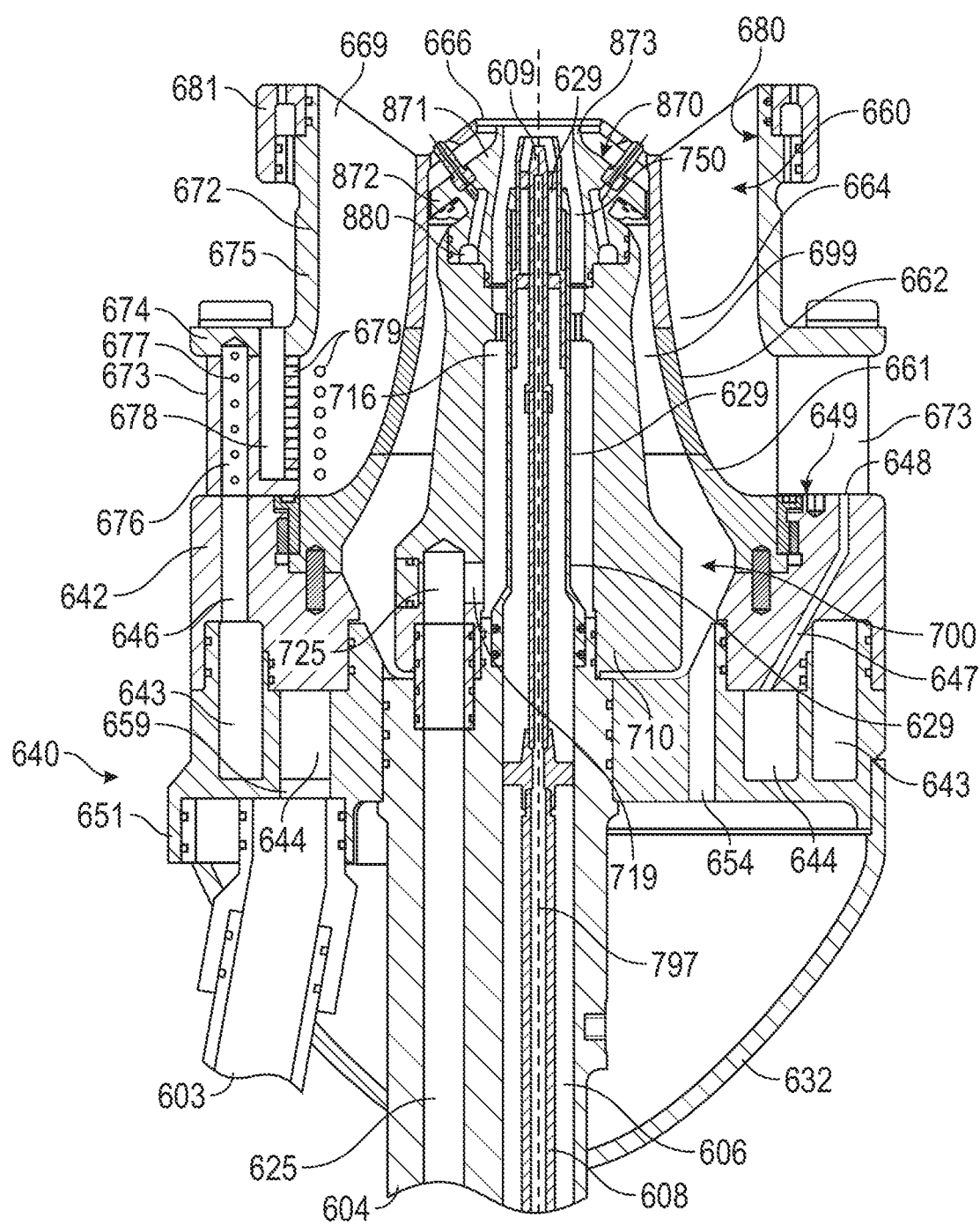
FIG. 7 is a cross-sectional view of the injector head of FIG. 6.
Figure 8:
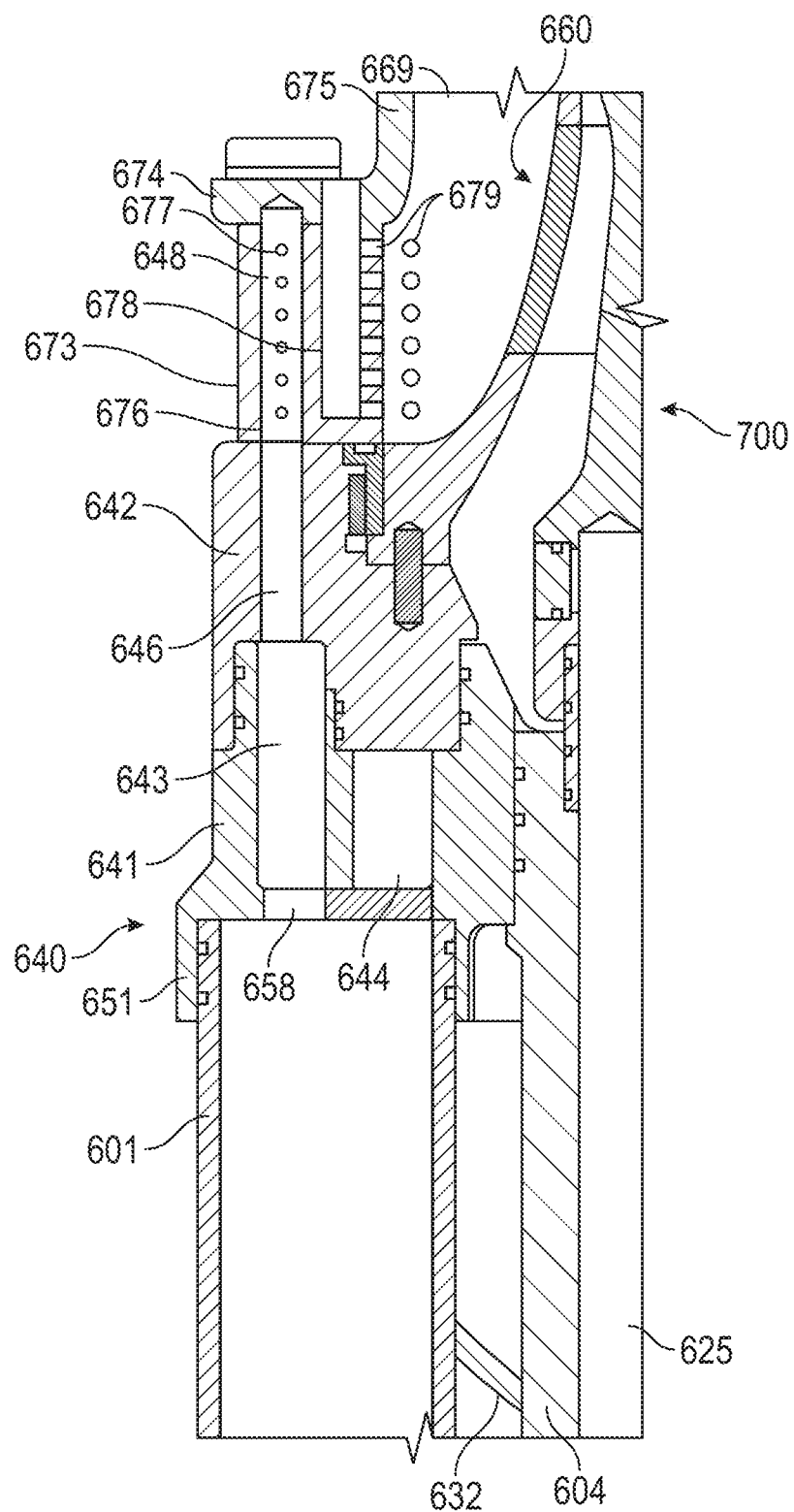
FIG. 8 is a cross-sectional view of a portion of the injector head of FIG. 6

FIG. 7 is a cross-sectional view of the injector head 630 of FIG. 6. FIG. 8 is a cross-sectional view of a portion of the injector head 630 of FIG. 6. Referring to FIGS. 6-8, the injector head 630 in this embodiment includes a primary gas gallery 643 and a secondary gas gallery 644. The primary gas gallery 643 and the secondary gas gallery 644 may be adjacent annular cavities. As shown, the primary gas gallery 643 and the secondary gas gallery 644 may be radially spaced apart with one radially inward of the other.

The embodiment of FIGS. 6-8 also includes primary gallery inlets 658 (shown in FIG. 8), body primary gas passages 646, vane primary gas passages 676, and primary gas outlets 677. A primary gallery inlet 658 is located between the first primary tube 601 and the primary gas gallery 643 and between the second primary tube 602 and the primary gas gallery 643. The body primary gas passages 646, vane primary gas passages 676, and primary gas outlets 677 may be the same or similar to those described in conjunction with the previous embodiment.

The primary gas fuel circuit includes the primary gas fitting 621, the first primary tube 601, the second primary tube 602, the primary gas gallery 643, the body primary gas passages 646, vane primary gas passages 676, and primary gas outlets 677. The first primary tube 601 and the second primary tube 602 are each in flow communication with the primary gas fitting 621 and the primary gas gallery 643. The primary gas gallery 643 is in flow communication with the body primary gas passages 646, vane primary gas passages 676, and primary gas outlets 677. The primary gas fuel circuit is configured to deliver main gas fuel from the primary gas fitting 621 to the premix passage 669 via the primary gas outlets 677.

The embodiment of FIGS. 6-8 also includes a secondary gallery inlet 659 (shown in FIGS. 6 and 7), secondary gas outlets 648, and secondary gas passages 647. The secondary gallery inlet 659 is located between the secondary tube 603 and the secondary gas gallery 644. Each secondary gas outlet 648 may be located at the injector body face 649 between adjacent vanes 673. The secondary gas outlets 648 may be configured to direct main gas fuel between the vanes 673 in an axial direction. Each secondary gas outlet 648 may extend into the forward portion 642 from the injector body face 649. The secondary gas outlets 648 may be evenly clocked in the circumferential direction so that a secondary gas outlet 648 is located between each set of adjacent vanes 673.

Each secondary gas passage 647 extends through the forward portion 642 from a secondary gas outlet 648 to the secondary gas gallery 644 to connect the secondary gas outlet 648 to the secondary gas gallery 644. In embodiments, each secondary gas passage 647 extends in the axially aft direction and in the radially outer direction from the secondary gas gallery 644 to the secondary gas outlets 648

The secondary gas fuel circuit includes the secondary gas fitting 623, the secondary tube 603, the secondary gas gallery 644, the secondary gas passages 647 and the secondary gas outlets 648. The secondary gas fuel circuit is configured to deliver main gas fuel from the secondary gas fitting 623 to the premix passage 669 via the secondary gas outlets 648.

Figure 9:
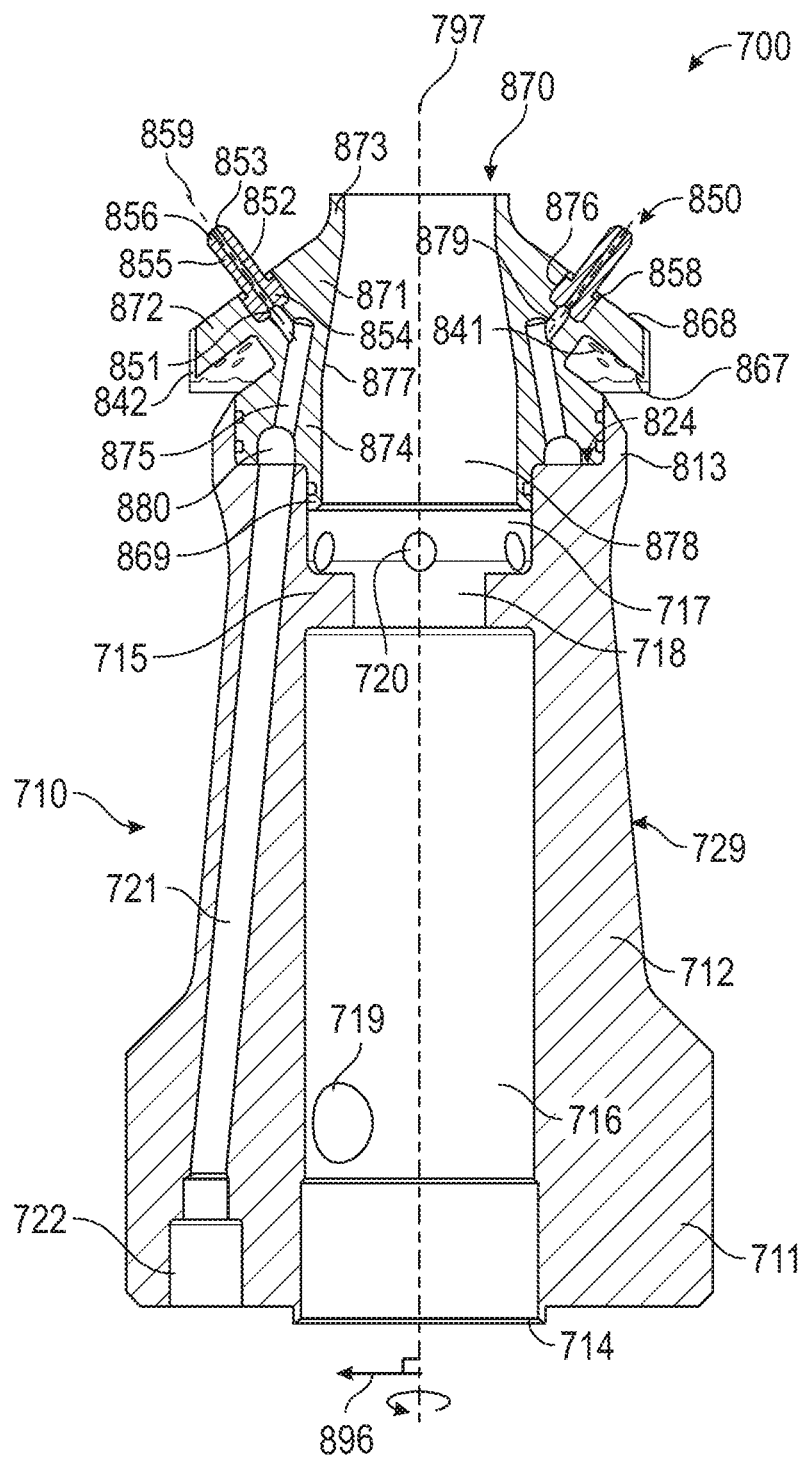
FIG. 9 is a cross-sectional view of the center body assembly of FIGS. 2-8.
Figure 10:
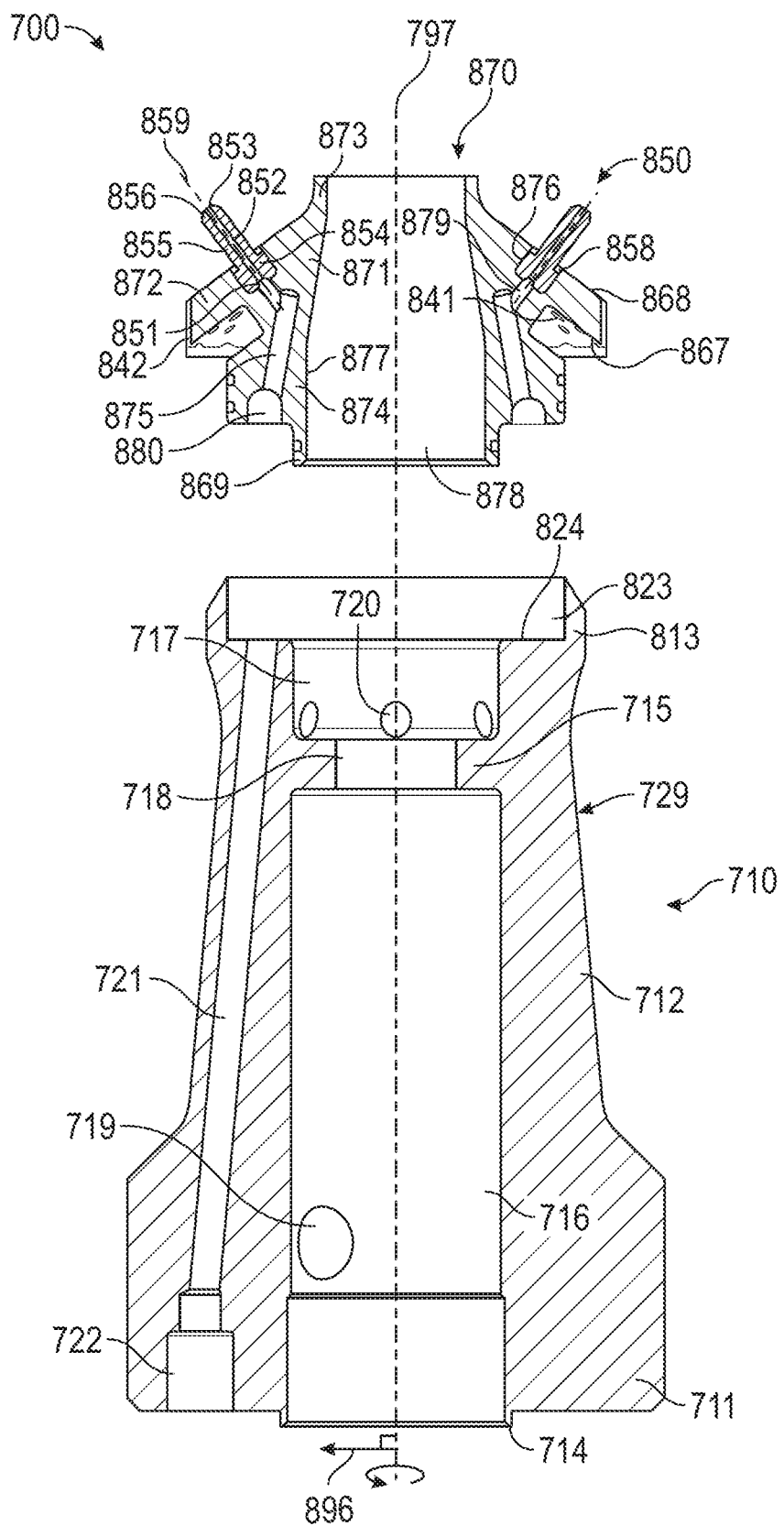
FIG. 10 is an exploded cross-sectional view of the center body assembly of FIG. 9.

FIG. 9 is a cross-sectional view of the center body assembly 700 of FIGS. 2-8. FIG. 10 is an exploded cross-sectional view of the center body assembly 700 of FIG. 9. Referring to FIGS. 9 and 10, the center body 710 may include a base end 711, a middle portion 712, a liquid main end 813, and a stem connector 714. The base end 711 may be a cylindrical shape and may be flanged relative to the middle portion 712. The middle portion 712 extends between the base end 711 and the liquid main end 813 and may taper from the base end 711 to the liquid main end 813. The liquid main end 813 is distal to the base end 711 and may be flanged relative to the middle portion 712. The stem connector 714 may be a hollow cylinder shape and may extend from the base end 711 in the direction opposite the liquid main end 813. The stem connector 714 may be used to join the center body 710 to the tube stem 604. In some embodiments, the stem connector 714 may also be a counterbore that extends into the base end 711 and receives a portion of the tube stem 604.

The center body 710 also includes the aft pilot bore 716, the liquid main port 823, a forward pilot bore 717, an inner flange 715, and a pilot tube bore 718. The aft pilot bore 716 may extend from the base end 711 and into the middle portion 712. The aft pilot bore 716 may extend from the stem connector 714 to the inner flange 715. The liquid main port 823 extends into the liquid main end 813. The liquid main port 823 may be concentric to the liquid main end 813. The liquid main port 823 may be a counterbore that is configured to receive the liquid main assembly 870. The forward pilot bore 717 may extend from the liquid main port 823 to the inner flange 715. The liquid main port 823 may include a liquid main port surface 824 that is the bottom surface of the liquid main port 823. The liquid main port surface 824 may be in the shape of an annulus.

The inner flange 715 may extend radially inward from the middle portion 712. The inner flange 715 may be a hollow cylinder and may form the pilot tube bore 718. The pilot tube bore 718 may connect the aft pilot bore 716 to the forward pilot bore 717. The pilot tube bore may be in flow communication with the aft pilot bore 716 and may be in flow communication with the forward pilot bore 717. The center body 710 may also include pilot air inlets 720 extending through the middle portion 712 to the forward pilot bore 717. The pilot air inlets 720 may allow compressor discharge air to enter into the forward pilot bore 717 and mix with the pilot gas fuel prior to being directed into the combustion chamber 390.

The pilot gas inlet 719, the aft pilot bore 716, the pilot tube bore 718, and the forward pilot bore 717 may also form part of the pilot gas fuel circuit.

A pilot assembly may include the aft pilot bore 716, the pilot tube bore 718, the forward pilot bore 717, the pilot gas port 725, and the pilot gas inlets 270. The pilot assembly may be in flow communication with the pilot gas passage 625. The pilot assembly, for example, may be pilot assembly means for directing pilot fuel through the center body 710.

The liquid main assembly 870 may include a liquid main base flange 869, a liquid main base 874, the liquid main body 871, the liquid main flange 872, a liquid main body face 868, a liquid main atomizer bore 876 and a liquid main tip 873. The liquid main base flange 869 extends from the liquid main base 874 towards the base end 711 and adjacent the liquid main port 823 for joining the liquid main assembly 870 to the center body 710. The liquid main base flange 869 may be a hollow cylinder shape and may have an outer diameter that is smaller than the outer diameter of the liquid main base 874. The liquid main base flange 869 may be sized to fit within the forward pilot bore 717 so that the liquid main base 874 may abut the liquid main end 813 within the liquid main port 823 adjacent the forward pilot bore 717.

The liquid main base 874 is located in the liquid main port 823 and abutting the liquid main port surface 824. The liquid main base 874 may be adjacent the liquid main body 871 and may be sized relative to the liquid main port 823. The liquid main assembly 870 and the center body 710 may be joined at the liquid main base 874 and the liquid main port 823. The liquid main base 874 may be located in the liquid main port 823 and may abut the liquid main port surface 824.

The liquid main body 871 is adjacent the liquid main base 874. The liquid main body 871 may taper along the outside edge as it extends away from the liquid main base 874. The liquid main body 871 may taper along the liquid main body face 868 from the liquid main flange 872 to the liquid main tip 873. The liquid main body 871 may be a cross-sectional shape that is revolved about the assembly axis 797.

The liquid main flange 872 is adjacent the liquid main body 871. The liquid main flange 872 may extend outward from the liquid main body 871 to locate the center body assembly 700 relative to the inner premix tube 660 of the fuel injector 600

The surface created by the liquid main body 871 and the liquid main flange 872 nearest the tip face 665 is the liquid main body face 868. The liquid main body face 868 may be shaped parallel to the tip face 665. The liquid main body face 868 may be angled away from the assembly axis radial 896.

The liquid main body 871 may include the liquid main atomizer bore 876 that extends from the liquid main body face 868 inward to the liquid main body 871. The liquid main atomizer bore 876 may form a counterbore that axially extends from the liquid main body face 868 inward to a liquid main second passage 879. The liquid main atomizer bore 876 may form a counterbore perpendicular to the liquid main body face 868 that is appropriately sized to fit the atomizer assembly 850. The atomizer assembly 850 may be secured with the liquid main atomizer bore 876 located in the liquid main body 871. The liquid main atomizer bore 876 may also be a counterbore for an atomizer insert 858 that may be used to secure the atomizer assembly 850 to the liquid main body 871.

The liquid main tip 873 extends from the liquid main body 871 distal to the liquid main base flange 869. The liquid main tip 873 may be an annulus shape.

The liquid main assembly 870 may further be a liquid main bore 877 with a liquid main bore surface 878.

The liquid main bore 877 may extend from the liquid main base flange 869 to the liquid main tip 873. The liquid main bore 877 may be is in flow communication with the forward pilot bore 717. The liquid main bore 877 may be a cylindrical shape. The cylindrical shape may be tapered or have a tapered liquid main bore surface 878. The liquid main bore 877 may alternatively be a frustum shape where the liquid main bore 877 is wider at the liquid main base flange 869 than at the liquid main tip 873. The liquid main bore 877 may allow for a mixture of compressor discharge air and gas pilot air to enter a combustion chamber 390 of the gas turbine engine. The liquid main bore 877 may direct the pilot gas fuel and compressor discharge air mixture from the forward pilot bore 717 to the combustion chamber 390 through the tip opening 666.

The liquid main bore surface 878 may be the surface of the liquid main bore 877. The liquid main bore surface 878 may contour the shape of the liquid main bore 877. The liquid main bore 877 may be a cylindrical shape. The cylindrical shape may be tapered.

The liquid gallery 880 aligns and is in flow communication with the primary liquid passage 721. The liquid gallery 880 comprises a channel located in the liquid main base 874, extending around the liquid main base 874, and abutting the liquid main port surface 824, adjacent the liquid main port 823. Referring to FIGS. 9-10, the liquid gallery 880 may be a circumferential slot that extends within and around the liquid main base 874. In one embodiment, the liquid gallery 880 may be a cross-sectional area that reduces in size or tapers from adjacent the primary liquid passage 721 to a smaller cross-sectional area as it extends further from the primary liquid passage 721. The liquid gallery 880 may be a constant cross-sectional shape that is revolved about assembly axis 797. The liquid gallery 880 may taper radially with respect to assembly axis 797.

The liquid main assembly 870 may further include a liquid main first passage 875, a liquid main second passage 879, and the atomizer assembly 850.

Referring to FIG. 9, the liquid main first passage 875 is in flow communication with the liquid gallery 880. The liquid main first passage 875 may be in flow communication between the liquid gallery 880 and a liquid main second passage 879. The liquid main first passage 875 may be a hollow cylindrical shaped cavity that axially extends within the liquid main base 874 and the liquid main body 871. The liquid main first passage 875 may alternatively be a bore that extends from the liquid gallery 880 through the liquid main base 874, into the liquid main body 871 and in flow communication with the liquid main second passage 879.

The liquid main second passage 879 is in flow communication with the liquid main first passage 875. The liquid main second passage 879 may be in flow communication between the liquid main first passage 875 and an atomizer assembly 850. The liquid main second passage 879 may extend from the liquid main first passage 875 to an atomizer inlet 851. The liquid main second passage 879 may be a bore through the liquid main body 871 that radially extends from an atomizer axis 859.

The atomizer assembly 850 may include the atomizer inlet 851, an atomizer bore 852, an atomizer outlet 853, an atomizer flange 854, the atomizer insert 858, an atomizer body 855, the atomizer tip 856, and the atomizer axis 859. The atomizer assembly 850 is in flow communication with the liquid main second passage 879. The atomizer assembly 850 may include a pressure swirl configuration or a plain orifice configuration. The atomizer assembly 850, for example, may be atomizer assembly 850 means for providing atomization of main liquid fuel for combustion as it enters the combustion chamber 390 (see FIG. 1). The atomizer assembly 850 may be connected to the liquid main body 871, such that the atomizer assembly 850 is angled away from the assembly axis 797. The atomizer assembly 850 may be connected to the liquid main body 871, such that the atomizer assembly 850 is parallel with respect to the assembly axis 797. When assembled, the atomizer assembly 850 may protrude through the atomizer opening 857 in the tip face 665.

The atomizer inlet 851 may be in flow communication with the liquid main second passage 879. The atomizer inlet 851 may extend from the liquid main second passage and adjoin the atomizer bore 852 opposite the liquid main second passage 879. The atomizer inlet 851 may extend radially from the atomizer axis 859. The atomizer inlet 851 may be a countersink with respect to the atomizer bore 852, such that the atomizer inlet 851 is wider at the liquid main second passage 879 and narrower at the atomizer bore 852. The atomizer inlet 851 may have a frusto-conical shape.

The atomizer bore 852 may be in flow communication with the atomizer inlet 851. The atomizer bore 852 may extend from the atomizer inlet 851 and adjoin the atomizer outlet 853, opposite of the atomizer inlet 851. The atomizer bore 852 allows for the delivery of liquid fuel from the atomizer inlet 851 to the combustion chamber 390. The atomizer bore 852 may extend radially from an atomizer axis 859 between the atomizer inlet 851 and the atomizer outlet 853 and may be cylindrical in shape.

The atomizer outlet 853 may be distal to the atomizer inlet 851 and be the outlet for the liquid fuel being delivered by the atomizer bore 852. The atomizer outlet 853 may extend radially from the atomizer axis 859.

The atomizer flange 854 may extend radially from the atomizer bore 852 adjacent the atomizer inlet 851 and axially extend to the atomizer body 855. When assembled, the atomizer flange 854 may adjoin or connect to the liquid main body 871 within the liquid main atomizer bore 876. The atomizer flange 854 may be shaped as a hollow cylinder with a void having a frusto-conical shape forming the atomizer inlet 851.

The atomizer insert 858 may be located adjacent the top of the atomizer flange 854. The atomizer insert 858 may encircle the atomizer body 855 and be an annulus shape. The atomizer insert 858 may be used to secure the atomizer assembly 850 to the liquid main body 871 within the liquid main atomizer bore 876. The atomizer insert 858 may be positioned parallel to the liquid main body face 868. The atomizer insert 858 may be empty space.

The atomizer body 855 may extend radially from the atomizer bore 852 and extend from the atomizer flange 854 and to the liquid main tip 873. When assembled, the atomizer body 855 may extend up to or through the atomizer opening 857 in the tip face 665. The atomizer body 855 may be shaped as a hollow cylinder.

The atomizer tip 856 may extend from the atomizer body 855 towards the atomizer outlet 853. The atomizer tip 856 may extend up to or through the atomizer opening 857 in the tip face 665. The atomizer tip 856 may be shaped as a hollow cylinder. The atomizer tip 856 may radially extend from the atomizer bore 852 and having a frusto-conical shape with a bore through the center.

The liquid main assembly may further include a liquid main flange face 867, a liquid main flange air passage 841, and a liquid main flange edge air passage 842. The liquid main flange face 867 may include the surface of the liquid main flange 872 facing towards the liquid main base 874 and facing the opposite direction of the liquid main body face 868. The liquid main flange face 867 may be shaped parallel to the liquid main body face 868.

The liquid main flange air passage 841 may be a bore into the liquid main flange face 867, extending through the liquid main flange 872 and exiting the liquid main body face 868. The liquid main flange air passage 841 may be positioned perpendicular to the liquid main flange face 867. The liquid main flange air passage 841 may be used to provide compressor discharge air from the air pathway 699 to help encourage liquid fuel moving away from the atomizer assembly 850.

The liquid main flange edge air passage 842 may be a bore along the liquid main flange 872 located where the liquid main flange 872 is adjacent the inner surface of the tip end 663. The liquid main flange edge air passage 842 may be an annulus shaped gap along the liquid main flange 872 located where the liquid main flange 872 is adjacent the inner surface of the tip end 663. The liquid main flange edge air passage 842 may be used to provide compressor discharge air from the air pathway 699 to help encourage liquid fuel moving away from the atomizer assembly 850.

The number of atomizer assemblies 850 may be selected to provide adequate atomized fuel into the combustion chamber 390. In embodiments, the liquid main assembly may include multiple atomizer assemblies 850 to provide adequate fuel for combustion.

Figure 11:
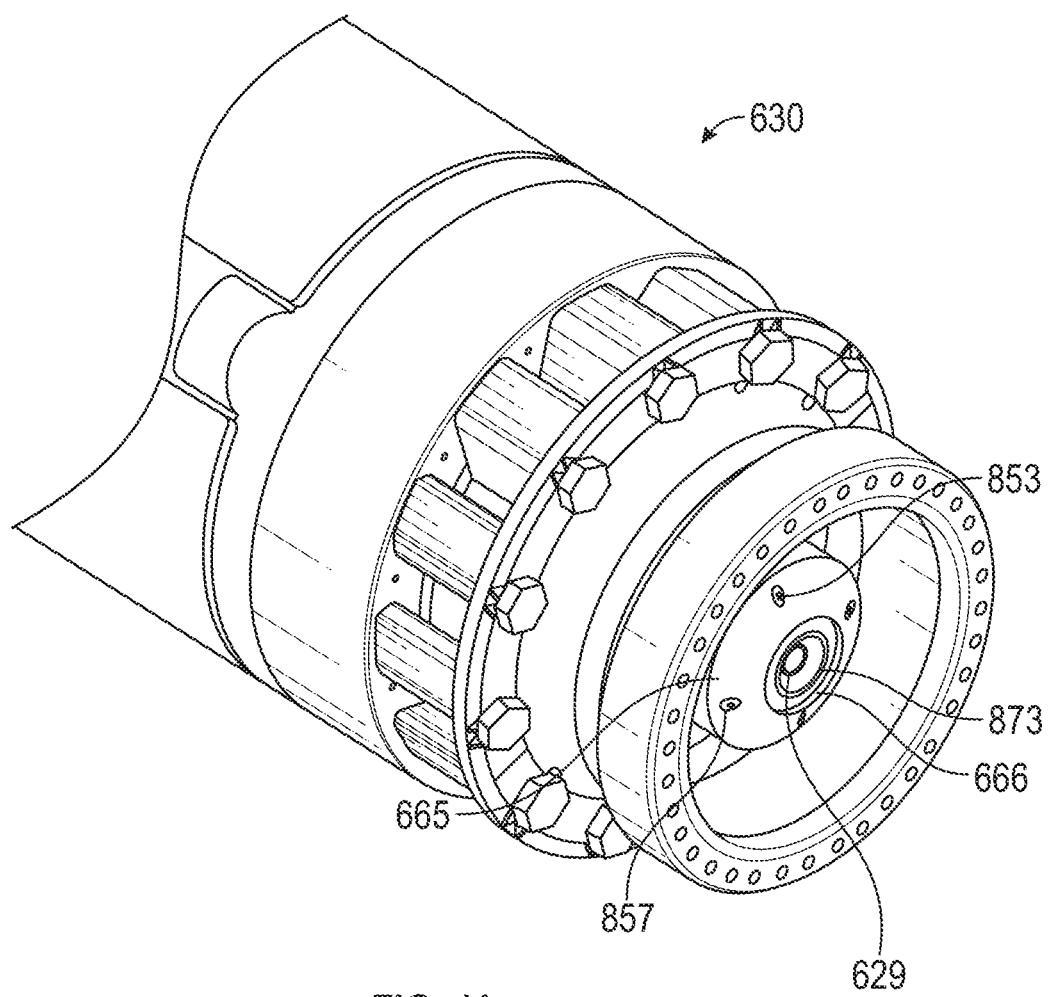
FIG. 11 is an isometric view of a portion of the injector head of the embodiments of FIGS. 2-8.

FIG. 11 is an isometric view of a portion of the injector head 630 of the embodiments of FIGS. 2-8. In one embodiment, the liquid main assembly 870 includes four atomizer assemblies 850 in which the atomizer tips 856 are protruding from the atomizer openings 857 in the tip face 665. In the embodiment illustrated in FIG. 11, the tip opening 666, the liquid main tip 873, and the pilot tube shield 629 are shown.

The main liquid fuel circuit may also include the liquid gallery 880, the liquid main first passage 875, the liquid main second passage 879, and the atomizer assembly 850.

While the embodiments of the center body assembly 700 include the center body 710 and the liquid main assembly 870 as separate components that are joined together, such as by metallurgical bonding, some embodiments include two or more of the center body assembly 700 components as an integral piece. This integral piece may be formed by an additive manufacturing or similar manufacturing process.

The bores, passages, cavities, holes, and other similar elements disclosed herein are formed in one of the flange assembly 610, tube stem 604, or the injector head 630, such as by a casting or machining process. The bores, passages, cavities, holes, and other similar elements are defined by the component through which they extend.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500. Likewise, each turbine disk assembly 420 may be associated with a numbered stage.

Once compressed air 10 leaves the compressor 200, it enters the combustor 300, where it is diffused and fuel, such as a liquid fuel or a gas fuel, is added. Air 10 and fuel are injected into the combustion chamber 390 via fuel injector 600 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

Fuel passing through a tube in the fuel injector 600 may cause a temperature change within the tube and may cause the tube to expand or contract. In the embodiment disclosed in FIGS. 3-5, the fuel injector 600 is configured to provide single primary gas fuel circuit that splits a single main gas fuel source into three parallel paths that direct the main gas fuel into the primary gas gallery 643. In the embodiment illustrated, the distribution block 612 splits into a first primary passage 615 that directs fuel into the first primary tube 601, a second primary passage 616 that direct fuel into the second primary tube 602, and a secondary passage 617 that directs fuel into the secondary tube 603.

By splitting the fuel three ways in the distribution block 612, the main gas fuel may be evenly supplied to each tube and may provide similar temperature gradients to each tube resulting in a similar thermal expansion in each tube. Maintaining a similar thermal expansion in each tube may prevent, inter alia, mechanical deformation of one or more of the tubes and may prevent deflection of the injector head 630.

In the embodiment disclosed in FIGS. 6-8, the main gas fuel is supplied by dual main gas fuel circuits, such as a primary gas fuel circuit and a secondary gas fuel circuit. In the embodiment illustrated, the primary gas fuel circuit injects main gas fuel into the premix passage 669 through the vanes 673 and the secondary gas fuel circuit injects main gas fuel into the premix passage 669 through the back plane of the injector body 640 at the injector body face 649.

The dual main gas fuel circuits may minimize the fuel pressure requirements across the operating range of the gas turbine engine and may provide for robust control of the main gas fuel delivery into the premix passage 669 for lean premixed combustion. This robust control may allow emission guarantees to be met for both low calorific value fuels, such as hydrocarbon based low Wobbe Index fuels, and high calorific value fuels, such as natural gas, using the same hardware.

When the gas turbine engine 100 is running on low calorific value gas fuels, such as gas fuels with a Wobbe Index from 450-750, both the primary and secondary main gas fuel circuits may supply fuel to the premix passage 669 over the entire operating range including light off, acceleration to idle, and the entire load range from idle to full load. The pilot gas fuel circuit may also supply gas fuel for combustion over the entire operating range. In embodiments, the percentage of fuel flow supplied through the secondary main gas fuel circuit may remain constant, while the percentage of fuel flow supplied through the primary main gas fuel circuit and through the pilot gas fuel circuit may vary depending on the operating conditions and emissions guarantee requirements.

When the gas turbine engine 100 is running on high calorific value gas fuels, such as gas fuels with a Wobbe Index from 750-1320, the secondary main gas fuel circuit and the pilot gas fuel circuit may provide the gas fuel for lower flow regimes, such as light off, idle, and up to a predetermined percentage of the load. The primary main gas fuel circuit may also provide gas fuel with the secondary main gas fuel circuit and the pilot gas fuel circuit for higher flow fuel regimes, such as from the predetermined percentage to full load. Providing the gas fuel for lower flow regimes through only the secondary main gas fuel circuit and the pilot gas fuel circuit may help control the pressure drop within the secondary main gas fuel circuit at lower fuel flows. Providing the gas fuel through the primary main gas fuel circuit and the secondary main gas fuel circuit at higher flow fuel regimes may help control the pressure drop with the higher fuel flows and may facilitate the appropriate air fuel mixing profile in the premix passage 669 to meet emissions guarantees.

Figure 12:
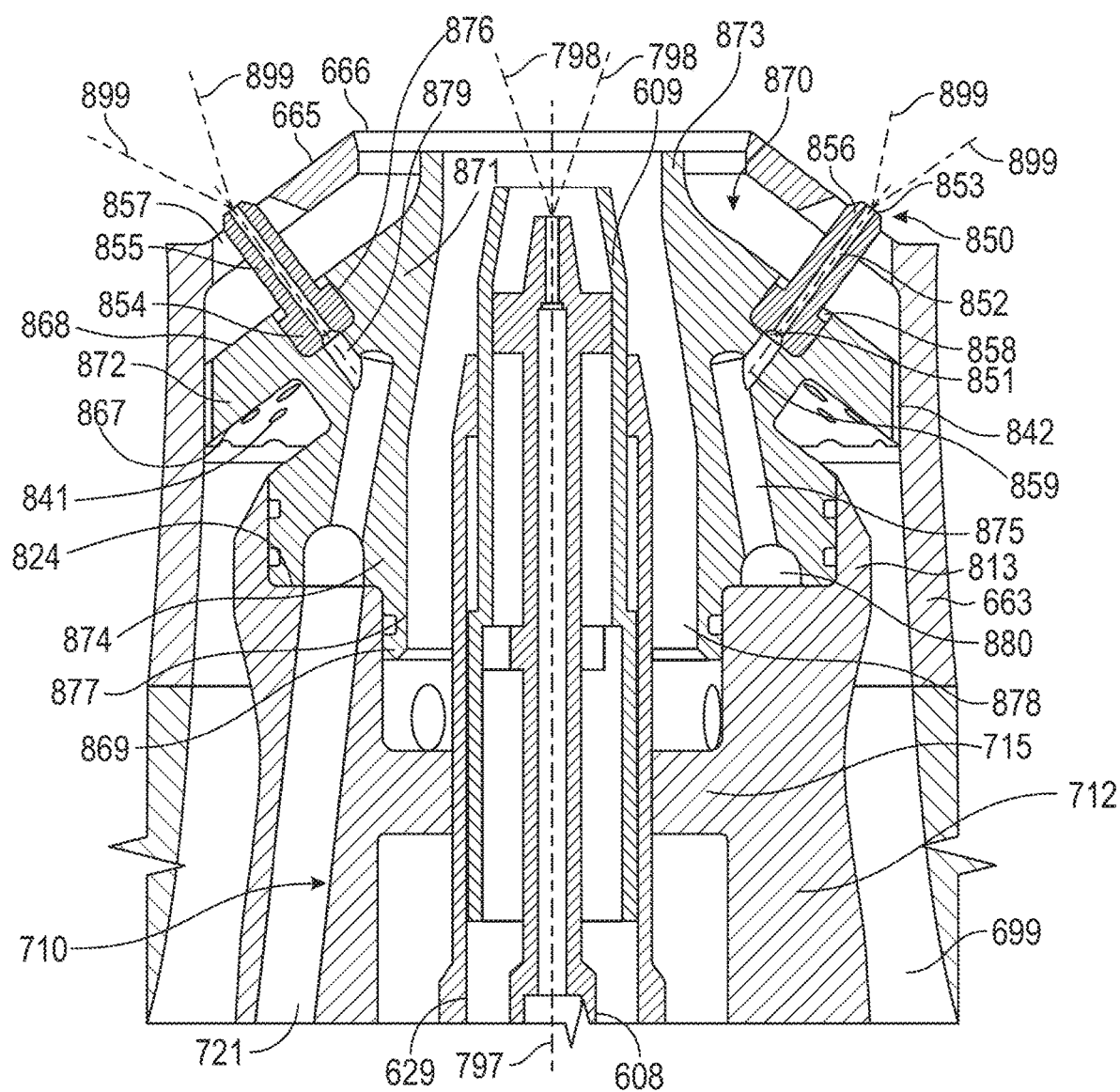
FIG. 12 is a cross-sectional view of a portion of the injector head of the embodiments of FIGS. 2-8.

The center body assembly 700 is configured to inject a stream of atomized liquid fuel into the combustion chamber 390. FIG. 12 is a cross-sectional view of a portion of the injector head 630 of the embodiments of FIGS. 2-8. As illustrated by the main reference lines 899 in FIG. 12, the stream of liquid fuel may exit the atomizer bore 852 at the atomizer outlet 853 and form a conical shaped stream. The tip face 665 and liquid main body face 868 may be angled with respect to the assembly axis radial 896 to help control the amount of air flow surrounding the atomizer assembly 850. The shape of the atomizer opening 857 can be selected to help control the amount of air flow surrounding the atomizer assembly 850. The atomizer assembly 850 may be angled with respect to the assembly axis 797 to help improve combustion and reduce smoke.

The center body assembly 700 may also be configured to maintain a near constant flued velocity around the liquid gallery 880. The cross-sectional area of the liquid gallery 880 may reduce in size from starting at the primary liquid passage 721 and reducing in size as the liquid gallery 880 moves further away from the primary liquid passage 721. This reduction in cross-sectional area may be a constant taper or may vary along the length of the liquid gallery 880. For example, the taper between sections may be configured so that the fluid velocity in the liquid gallery 880 is the same at an inlet of each liquid main first passage 875. Reducing the cross-sectional area of the liquid gallery 880 may help ensure that no sudden steps in the flow path are taken. Reducing the cross-sectional area of the liquid gallery 880 may also assist in evenly feeding the liquid fuel to the liquid main first passages 875 and help in the uniform distribution of liquid fuel.

Reducing the cross-sectional area of the liquid gallery 880 may also maintain the velocity of the liquid fuel above a threshold amount to prevent too much heat transfer to the liquid fuel that may lead to coking of the liquid fuel.

Referring again to FIG. 12, the pilot tube tip 609 may inject the pilot liquid fuel into the combustion chamber 390 in a conical pattern as illustrated by pilot reference lines 798. The conical spread of the pilot liquid fuel may be located between the conical spreads as illustrated by main reference lines 799 of the liquid fuel injected by the center body assembly 700.

The amount of liquid fuel injected by the main liquid fuel circuit via the center body assembly 700 and by the pilot liquid fuel circuit via the pilot tube tip 609 may be optimized for lean direct injection during the various stages operation to minimize smoke during light off and acceleration to idle and to minimize fuel pressure requirements of the system.

Figure 13:
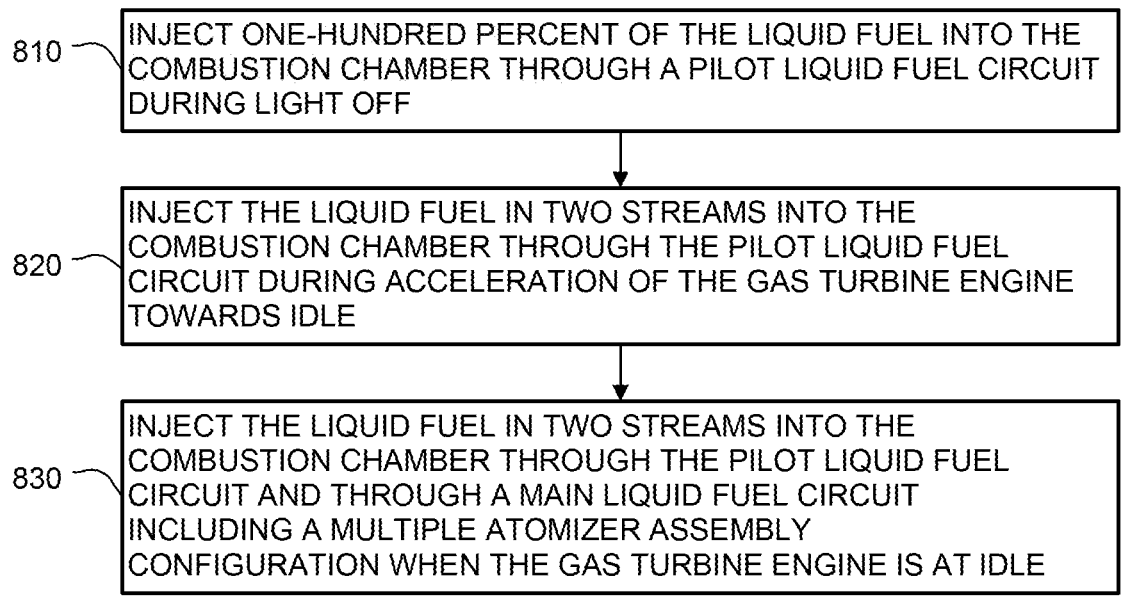
FIG. 13 is a flowchart of a method for lean direct injection of liquid fuel.

FIG. 13 is a flowchart of a method for lean direct injection of liquid fuel. The method includes injecting all, i.e., one-hundred percent, of the liquid fuel into the combustion chamber 390 through a pilot liquid fuel circuit, such as the pilot liquid fuel circuit described herein, during light off at step 810. The method also includes injecting the liquid fuel in two streams into the combustion chamber 390 through the pilot liquid fuel circuit during acceleration of the gas turbine engine 100 towards idle at step 820. The fuel atomization of the liquid fuel exiting the pilot tube tip 609 during light off and acceleration to idle may minimize smoke generation while providing a reliable light around of the combustion system.

The method further includes injecting the liquid fuel in two streams into the combustion chamber 390 through the pilot liquid fuel circuit and through a main liquid fuel circuit including a multiple atomizer configuration, such as the main liquid fuel circuit that includes the center body assembly 700, when that gas turbine engine 100 is at idle at step 830. Step 830 includes injecting a majority, such as approximately eighty-five percent, of the liquid fuel through the main liquid fuel circuit and the remainder of the liquid fuel through the pilot liquid fuel circuit. In some embodiments, a majority of the liquid fuel is from eighty to ninety percent of the liquid fuel injected. In other embodiments, a majority is from eighty-three to eighty-seven percent of the liquid fuel injected.

The method may include transitioning from injecting all of the liquid fuel through the liquid pilot fuel circuit to injecting the liquid fuel through the two streams with the majority of the liquid fuel being injected through the main liquid fuel circuit during a transition period at or before idle, such as near idle.

The method yet further includes injecting the liquid fuel in the two streams at the same or similar injection levels as step 830 through the operating ranges above idle. Injecting the liquid fuel through the two streams with a majority of the liquid fuel being injected in an atomized stream through the main liquid fuel circuit may minimize the fuel pressure requirements of the system while providing the liquid fuel and air mixture needed for lean direct injection.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular fuel injector, it will be appreciated that the fuel injector in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:
1. A center body assembly for a lean direct injection fuel injector of a gas turbine engine, the center body assembly comprising:
   a center body including
      an assembly axis extending in a longitudinal direction of the center body assembly,
      a base end,
      a liquid main end distal to the base end, a middle portion extending from the base end to the liquid main end,
a liquid tube port extending into the base end,
a liquid main port extending into the liquid main end, the liquid main port being concentric to the liquid main end, the liquid main port including a liquid main port surface that is a bottom surface of the liquid main port, and
a primary liquid passage extending from the liquid tube port to the liquid main port and in flow communication with the liquid tube port;
a liquid main assembly including
a liquid main base located in the liquid main port and abutting the liquid main port surface,
a liquid main base flange that extends from the liquid main base towards the base end and adjacent the liquid main port for joining the liquid main assembly to the center body,
a liquid main body adjacent the liquid main base,
a liquid gallery comprising a channel located in the liquid main base, extending around the liquid main base, abutting the liquid main port surface, and adjacent and in flow communication with the primary liquid passage,
a liquid main first passage in flow communication with the liquid gallery,
a liquid main second passage in flow communication with the liquid main first passage, and
an atomizer assembly in flow communication with the liquid main second passage;
a pilot gas port;
an aft pilot bore extending into the middle portion from the base end;
a forward pilot bore extending into the middle portion from the liquid main port;
an inner flange extending inward from the middle portion between the aft pilot bore and the forward pilot bore;
a pilot gas inlet extending from the pilot gas port to the aft pilot bore; and
pilot air inlets extending through the middle portion to the forward pilot bore.

2. The center body assembly of claim 1, wherein the liquid main assembly includes a liquid main bore that is in flow communication with the forward pilot bore.

3. The center body assembly of claim 1, wherein the liquid gallery tapers from adjacent the primary liquid passage to a smaller cross-sectional area as the liquid gallery extends further from the primary liquid passage.

4. The center body assembly of claim 1, wherein the liquid main assembly includes additional atomizer assemblies.

5. The center body assembly of claim 1, wherein the atomizer assembly angles away from the assembly axis.

6. The center body assembly of claim 1, wherein the liquid main assembly includes a liquid main body face that is not perpendicular to the assembly axis.

7. A lean direct injection fuel injector for a gas turbine engine, the fuel injector comprising:
a flange assembly,
a tube stem extending through the flange assembly, the tube stem defining a main liquid tube cavity extending through the tube stem,
an injector body,
an inner premix tube joined to the injector body,
a center body joined to the tube stem at a base end and located within the inner premix tube, the center body defining
a liquid tube port extending into the base end of the center body,
a liquid main port extending into a liquid main end of the center body, and
a primary liquid passage extending from the liquid tube port to the liquid main port and in flow communication with the liquid tube port;
an assembly axis extending in a direction a longitudinal to the center body,
a liquid main assembly joined to the center body at the liquid main port, the liquid main defining
a liquid gallery comprising a channel located in the liquid main base, extending around the liquid main base, and abutting the liquid main port surface, adjacent and in flow communication with the primary liquid passage,
a liquid main first passage in flow communication with the liquid gallery,
a liquid main second passage in flow communication with the liquid main first passage, and
an atomizer assembly in flow communication with the liquid main second passage and the atomizer assembly protrudes through an atomizer opening in the inner premix tube.

8. The lean direct injection fuel injector of claim 7, further comprising a main liquid tube extending through the main liquid tube cavity to the liquid tube port.

9. The lean direct injection fuel injector of claim 7, wherein the liquid main assembly includes a liquid main flange extending outward from the liquid main body to locate the liquid main assembly relative to the inner premix tube.

10. The lean direct injection fuel injector of claim 7, wherein the inner premix tube includes a tip face which angles away from a radial axis perpendicular to the assembly axis.

11. The lean direct injection fuel injector of claim 7, wherein the liquid gallery tapers from adjacent the primary liquid passage to a smaller cross-sectional area as the liquid gallery extends further from the primary liquid passage.

12. The lean direct injection fuel injector of claim 7, wherein the center body includes a stem connector distal to the liquid main port for joining the center body to the tube stem.

13. The fuel injector of claim 7, further comprising:
an aft pilot bore formed in the center body adjacent the base end,
a forward pilot bore formed in the center body adjacent the liquid main port,
an inner flange extending inward from the center body between the aft pilot bore and the forward pilot bore,
a pilot gas port formed in the base end for receiving pilot gas fuel from a pilot gas passage,
a pilot gas inlet formed in the base end and extending from the pilot gas port to the aft pilot bore, and
pilot air inlets formed in the center body and extending through the center body to the forward pilot bore for providing compressor discharge air into the center body assembly.

14. A center body assembly for a lean direct injection fuel injector of a gas turbine engine, the center body assembly comprising:
a center body including
a base end,
a liquid main end distal to the base end,
a middle portion extending from the base end to the liquid main end, a liquid tube port extending into the base end,
a liquid main port extending into the liquid main end, the liquid main port being concentric to the liquid main end, the liquid main port including a liquid main port surface that is a bottom surface of the liquid main port, and
a primary liquid passage extending from the liquid tube port to the liquid main port and in flow communication with the liquid tube port; and
a liquid main assembly including
  a liquid main base located in the liquid main port and abutting the liquid main port surface,
  a liquid main base flange that extends from the liquid main base towards the base end and adjacent the liquid main port for joining the liquid main assembly to the center body,
  a liquid main body adjacent the liquid main base,
  a liquid gallery comprising a channel located in the liquid main base, extending around the liquid main base, and abutting the liquid main port surface, adjacent and in flow communication with the primary liquid passage, wherein the liquid gallery tapers from adjacent the primary liquid passage to a smaller cross-sectional area as the liquid gallery extends further from the primary liquid passage,
  a liquid main first passage in flow communication with the liquid gallery,
  a liquid main second passage in flow communication with the liquid main first passage, and
  atomizer assembly means in flow communication with the liquid main second passage for atomizing main liquid fuel for combustion; and
pilot assembly means for directing pilot gas fuel through the center body for combustion.

15. The center body assembly of claim 14, wherein the pilot assembly means further comprises
a pilot gas port,
an aft pilot bore extending into the middle portion from the base,
a pilot gas inlet extending from the pilot gas port to the aft pilot,
a forward pilot bore extending into the middle portion from the liquid main port,
a pilot tube bore extending from the aft pilot bore to the forward pilot bore, and
pilot air inlets extending through the middle portion to the forward pilot bore.

16. The center body assembly of claim 14, wherein the liquid main assembly includes a liquid main bore that allows a mixture of compressor discharge air and the pilot gas fuel through the center body assembly.

17. The center body assembly of claim 14, wherein the atomizer assembly means includes a plurality of atomizer assemblies.

* * * * *